US012674912B2

(12) United States Patent　　(10) Patent No.: US 12,674,912 B2
Tsunetomo et al.　　(45) Date of Patent:　Jul. 7, 2026

(54) ILLUMINATION DEVICE, LENS, SET OF DIFFUSION ELEMENT AND LENS, SENSOR DEVICE, AND TRAVELING BODY

(71) Applicant: Nippon Sheet Glass Company, Limited, Tokyo (JP)

(72) Inventors: Keiji Tsunetomo, Sagamihara (JP); Satoru Kusaka, Setagaya-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 334 days.

(21) Appl. No.: 18/481,781

(22) Filed: Oct. 5, 2023

(65) Prior Publication Data

US 2024/0027650 A1　　Jan. 25, 2024

Related U.S. Application Data

(63) Continuation of application No. PCT/JP2022/014912, filed on Mar. 28, 2022.

(30) Foreign Application Priority Data

Apr. 8, 2021　(JP) ................................. 2021-066125

(51) Int. Cl.
*G02B 19/00*　　(2006.01)
*G02B 1/04*　　(2006.01)
*G02B 5/02*　　(2006.01)
*G02B 9/30*　　(2006.01)
*G02B 27/09*　　(2006.01)

(52) U.S. Cl.
CPC ............. *G02B 1/041* (2013.01); *G02B 5/021* (2013.01); *G02B 9/30* (2013.01); *G02B 27/0916* (2013.01)

(58) Field of Classification Search
CPC ..... G02B 5/021; G02B 19/0047; G02B 27/09
See application file for complete search history.

(56) References Cited

U.S. PATENT DOCUMENTS

2020/0018827 A1 *　1/2020　Yamamoto ................ F21S 2/00

FOREIGN PATENT DOCUMENTS

| | | |
|---|---|---|
| CN | 106461815 A | 2/2017 |
| CN | 107430220 A | 12/2017 |
| CN | 109996991 A | 7/2019 |
| CN | 209784721 U | 12/2019 |
| JP | 2017-97058 A | 6/2017 |
| JP | 2018-133138 A | 8/2018 |
| JP | 2020-67664 A | 4/2020 |
| KR | 10-2020-0047290 A | 5/2020 |

(Continued)

OTHER PUBLICATIONS

Communication issued Sep. 16, 2025 in Japanese Application No. 2023-512949.

(Continued)

*Primary Examiner* — Joseph P Martinez
(74) *Attorney, Agent, or Firm* — Sughrue Mion, PLLC

(57)　　ABSTRACT

An illumination device includes: a light source that emits parallel light or divergent light; a diffusion element that receives the light emitted from the light source and emits the light at a diffusion angle of 50° or more and 110° or less; and a lens group that has negative power, receives the light from the diffusion element by a first surface, and emits the light from a second surface at a light distribution angle of 140° or more.

9 Claims, 23 Drawing Sheets

(56)　　　　　References Cited

FOREIGN PATENT DOCUMENTS

| | | |
|---|---|---|
| KR | 10-2206236 B1 | 1/2021 |
| TW | 201743146 A | 12/2017 |

OTHER PUBLICATIONS

Communication issued Aug. 14, 2025 in Taiwanese Application No. 111112405.

International Search Report issued May 24, 2022 in International Application No. PCT/JP2022/014912.

International Preliminary Report on Patentability dated Oct. 10, 2023 with a Translation of the Written Opinion of the International Searching Authority in Application No. PCT/JP2022/014912.

Extended European Search Report issued Feb. 24, 2025 in Application No. 22784558.3.

Communication dated Mar. 28, 2026, in Chinese Application No. 202280026422.9.

\* cited by examiner

FIG.5A                                                      FIG.5B $\eta_{21} / \eta_{32}$ $\eta_{21} / \eta_{32}$ FIG.27A          FIG.27B          FIG.27C          FIG.27D
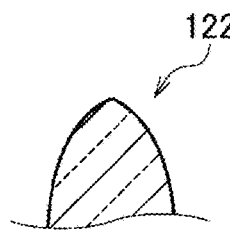         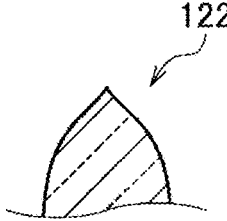
FIG.27E          FIG.27F          FIG.27G
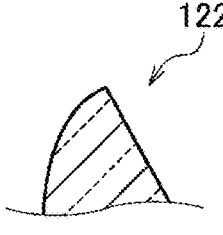   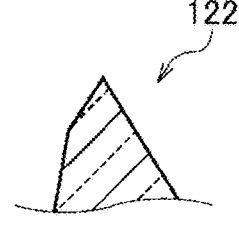   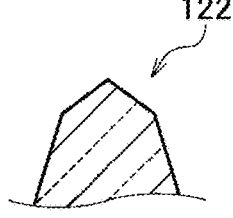
FIG.28
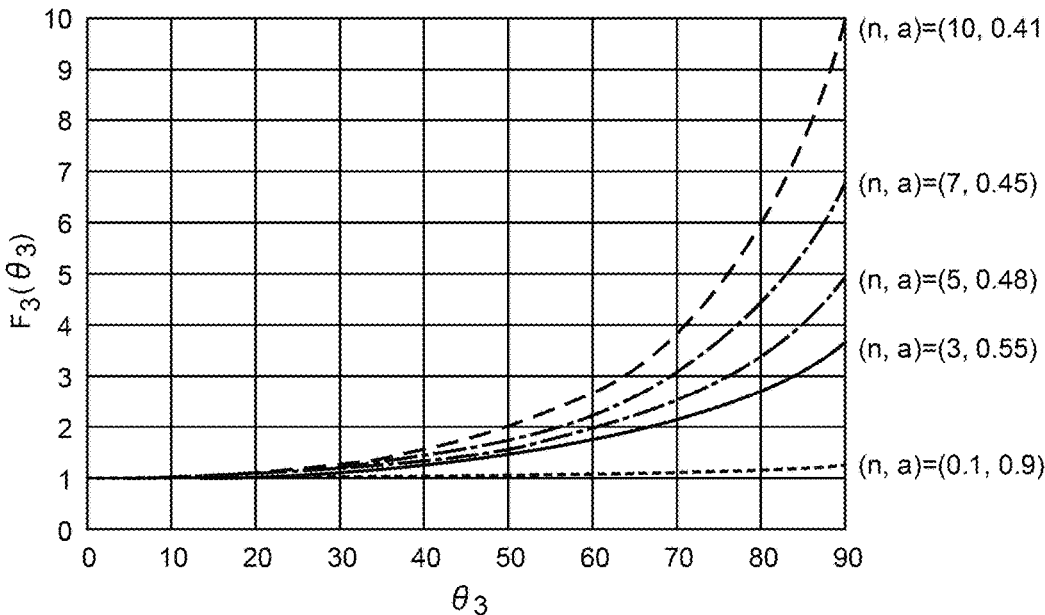

$\theta_{1max} [°]$

--○-- $\eta_1$    --●-- $\eta_{21}$    --□-- $\eta_{32}$ $\theta_{1max} [°]$

--○-- $\eta_1$    --●-- $\eta_{21}$    --□-- $\eta_{32}$

ILLUMINATION DEVICE, LENS, SET OF DIFFUSION ELEMENT AND LENS, SENSOR DEVICE, AND TRAVELING BODY

BACKGROUND OF THE INVENTION

1. Field of the Invention

The present invention relates to an illumination device.

BACKGROUND ART

In recent years, for example, an illumination device using a laser as a light source is used as illumination of an in-vehicle peripheral monitoring sensor, an in-vehicle monitoring sensor, or a monitoring sensor that monitors a moving body such as a person in a facility such as a hospital or a factory.

Such an illumination device is required to increase the spread of a beam of laser light and to emit light at a wide angle (for example, 180°) in order to illuminate as wide a range as possible with the laser light emitted from one light source. Here, the wide angle includes, for example, a wide angle in a horizontal direction and a wide angle in a vertical direction in addition to the horizontal direction.

Conventionally, as a mechanism for diffusing laser light, for example, a diffusion plate such as a frost type or an opal type for diffusing light, and a diffusion element such as a microlens array, a microprism array, or a DOE have been used. However, in a configuration in which the diffusion plate and the diffusion element (hereinafter, referred to as the "diffusion element") are used alone, there is a limit to efficiently widening the angle of the laser light. In order to exceed the limit, a method is known in which a diffusion element and a lens having negative power are combined, and light spread by the diffusion element is further spread by the lens to achieve a wide angle.

For example, Patent Document 1 discloses a laser illumination device including a laser light source, a microelement lens that spreads laser light from the laser light source, and a meniscus lens having negative power that spreads laser light from the microelement lens, for the purpose of securing safety of human eyes.

[Patent Document 1] Japanese Patent Application Publication No. 2018-133138

SUMMARY OF THE INVENTION

In the laser illumination device disclosed in Patent Document 1, the meniscus lens having negative power is installed behind the microelement lens for the purpose of increasing an apparent light source size projected onto the human eyes and securing safety to the eyes. However, a light distribution angle is only described as a wide angle (for example, 140°), and a configuration for further spreading light is not disclosed.

The present invention has been made in view of such a situation, and an object thereof is to provide an illumination device capable of spreading light at a wider angle.

In order to solve the above problem, an illumination device according to an aspect of the present invention includes: a light source that emits parallel light or divergent light; a diffusion element that receives the light emitted from the light source and emits the light at a diffusion angle of 50° or more and 110° or less; and a lens group that has negative power, receives the light from the diffusion element by a first surface, and emits the light from a second surface at a light distribution angle of 140° or more.

Note that any combinations of the above components and conversions of the expressions of the present invention among methods, apparatuses, systems, and the like are also effective as aspects of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 27(a), 27(b), 27(c), 27(d), 27(e), 27(f) and 27(g) are diagrams illustrating examples of a cross-sectional shape of a microlens.

FIG. 28 is a diagram illustrating a graph representing functions of $F_3(\theta_3)=\{\cos(0.9\times\theta_3)\}^{-0.1}$ and $F_3(\theta_3)=\{\cos(0.415\times\theta_3)\}^{-10}$, and a graph of some functions included between the functions.

DETAILED DESCRIPTION OF THE INVENTION

Figure 1:
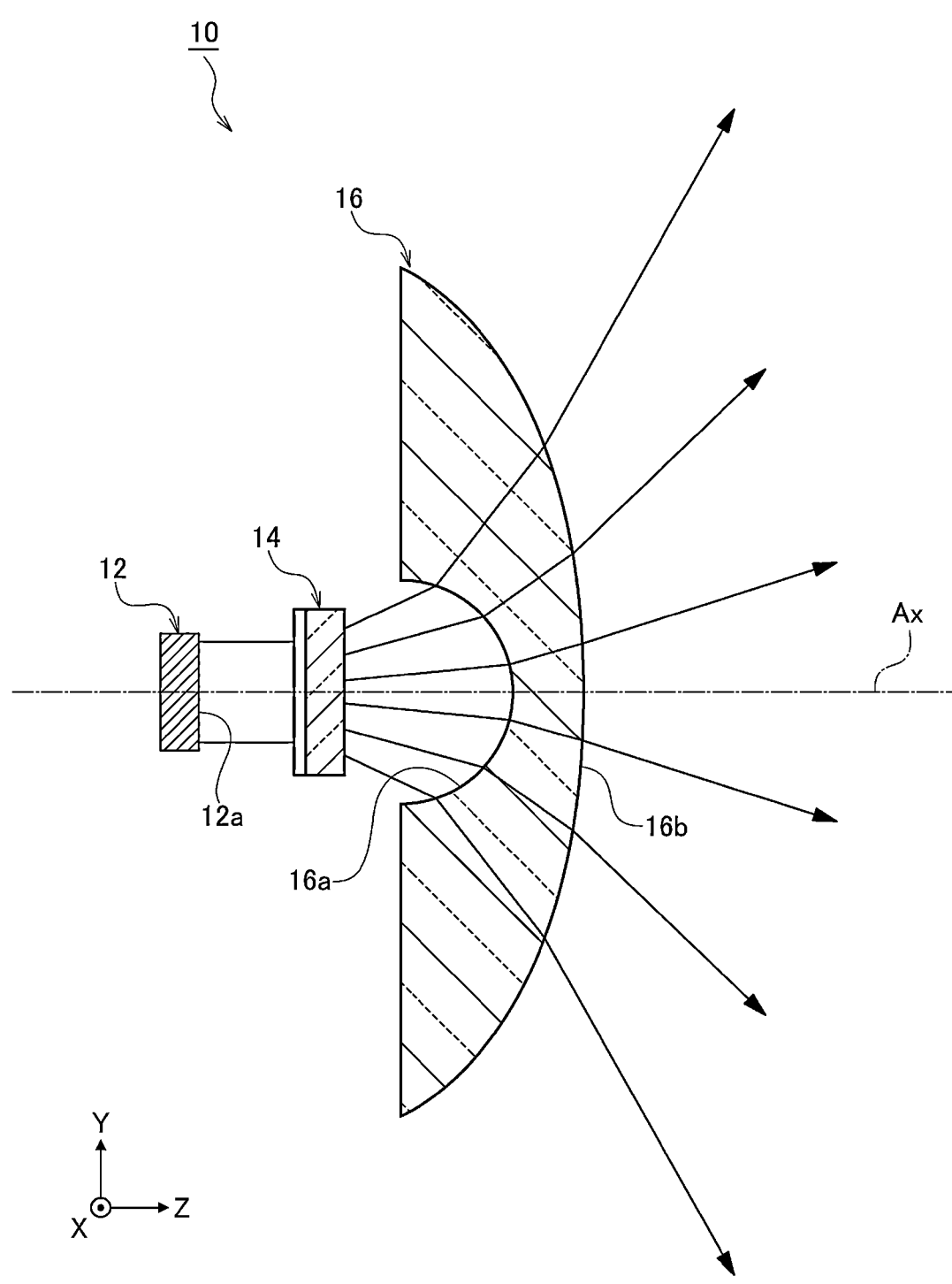
FIG. 1 is a schematic cross-sectional view of an illumination device according to an embodiment of the present invention.

Hereinafter, embodiments of the present invention will be described. The same or equivalent components, members, and processes illustrated in the drawings will be denoted by the same reference numerals, and repeated description will be omitted as appropriate. Further, the embodiments do not limit the invention, but are exemplary, and all features and combinations thereof described in the embodiments are not necessarily essential to the invention.

Figure 2:
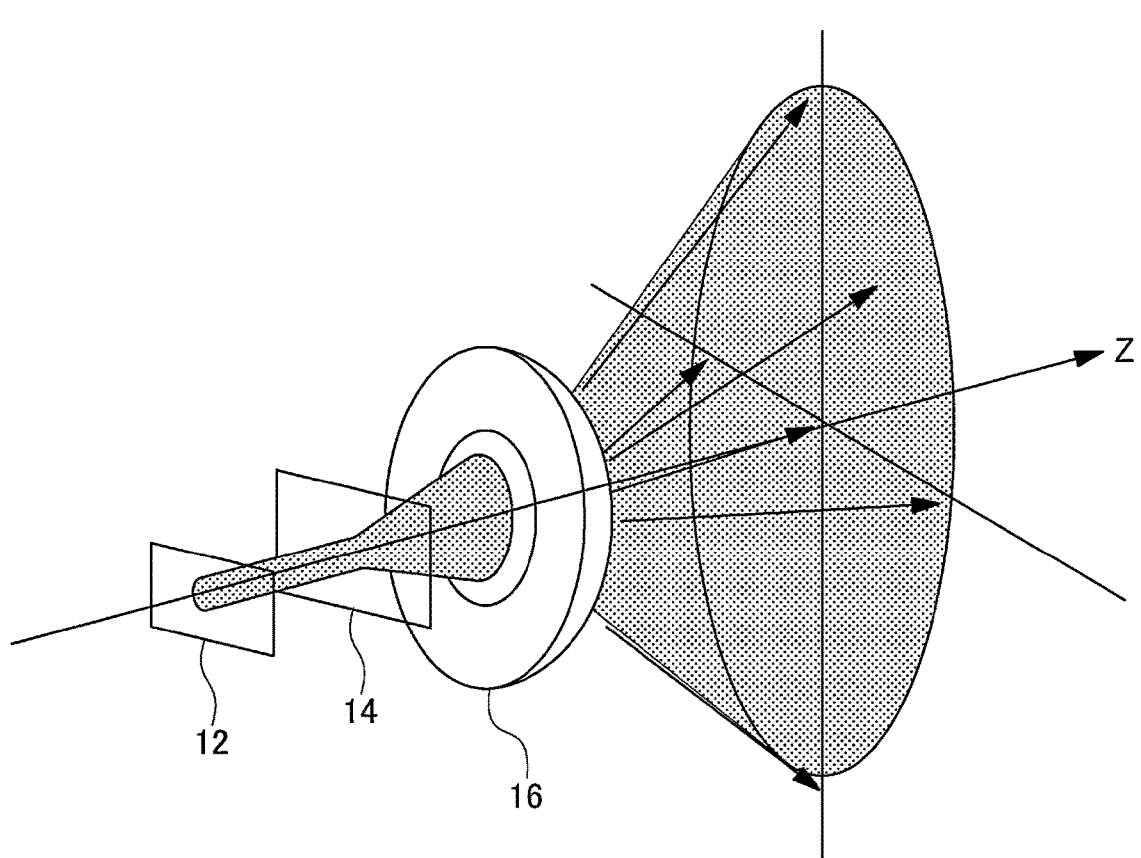
FIG. 2 is a schematic perspective view of the illumination device according to the embodiment of the present invention.

FIG. 1 is a schematic cross-sectional view of an illumination device 10 according to an embodiment of the present invention. FIG. 2 is a schematic perspective view of the illumination device 10 according to the embodiment of the present invention. As illustrated in FIGS. 1 and 2, the illumination device 10 includes a light source 12, a diffusion element 14, and a lens group 16.

The light source 12 emits parallel light or divergent light. The light source 12 can be a laser light source that emits particularly coherent laser light. The diffusion element 14 receives the light emitted from the light source 12 and emits the light at a diffusion angle of 50° or more and 110° or less. The diffusion element 14 may have a plate shape, and may be a microlens array including a plurality of microlenses on any principal surface of a plate in particular. The lens group 16 has negative power. The lens group 16 receives the light emitted from the diffusion element 14 and emits the light at a light distribution angle of 140° or more. The lens group 16 can be a single meniscus lens in particular. The "lens group" may include one or a plurality of lenses, and in a case where the lens group includes a plurality of lenses, the lens group represents a group of the plurality of lenses.

The total light transmittance of the diffusion element 14 including the microlens decreases when the diffusion angle increases. On the other hand, with respect to the total light transmittance of the lens group 16, when the diffusion angle increases, an incidence angle on a lens surface increases and the reflectance increases, so that the transmittance decreases.

Here, the light source 12 is a laser light source, and an axis on which an intensity distribution of the light emitted from the light source 12 is symmetric is an optical axis Ax of the illumination device 10. The optical axis Ax may be perpendicular to a light emission surface 12a of the light source 12 and may pass through the center of the light emission surface 12a. As illustrated in FIG. 1, for the following description, coordinate axes of X, Y, and Z are defined such that a direction parallel to the optical axis Ax is a Z direction, a direction perpendicular to the Z direction and parallel to a paper surface is a Y direction, and a direction perpendicular to the paper surface is an X direction.

The lens group 16 is a single lens or a single lens equivalent to the lens group 16, a surface that receives light emitted from the diffusion element 14 is a first surface 16a, and a surface that substantially faces the first surface 16a and emits light is a second surface 16b. In a case where the lens group 16 is a single lens of a meniscus lens, when a curvature of the first surface 16a is C1 and a curvature of the second surface 16b is C2, C1<0, C2<0, and |C2|<|C1| (in a case of having negative power) are satisfied. The curvature is the reciprocal of a paraxial radius when a paraxial region of each surface is approximated to a spherical surface. In the meniscus lens, when |C2|<|C1| is satisfied, the meniscus lens may be referred to as a meniscus lens having negative power.

Figure 3:
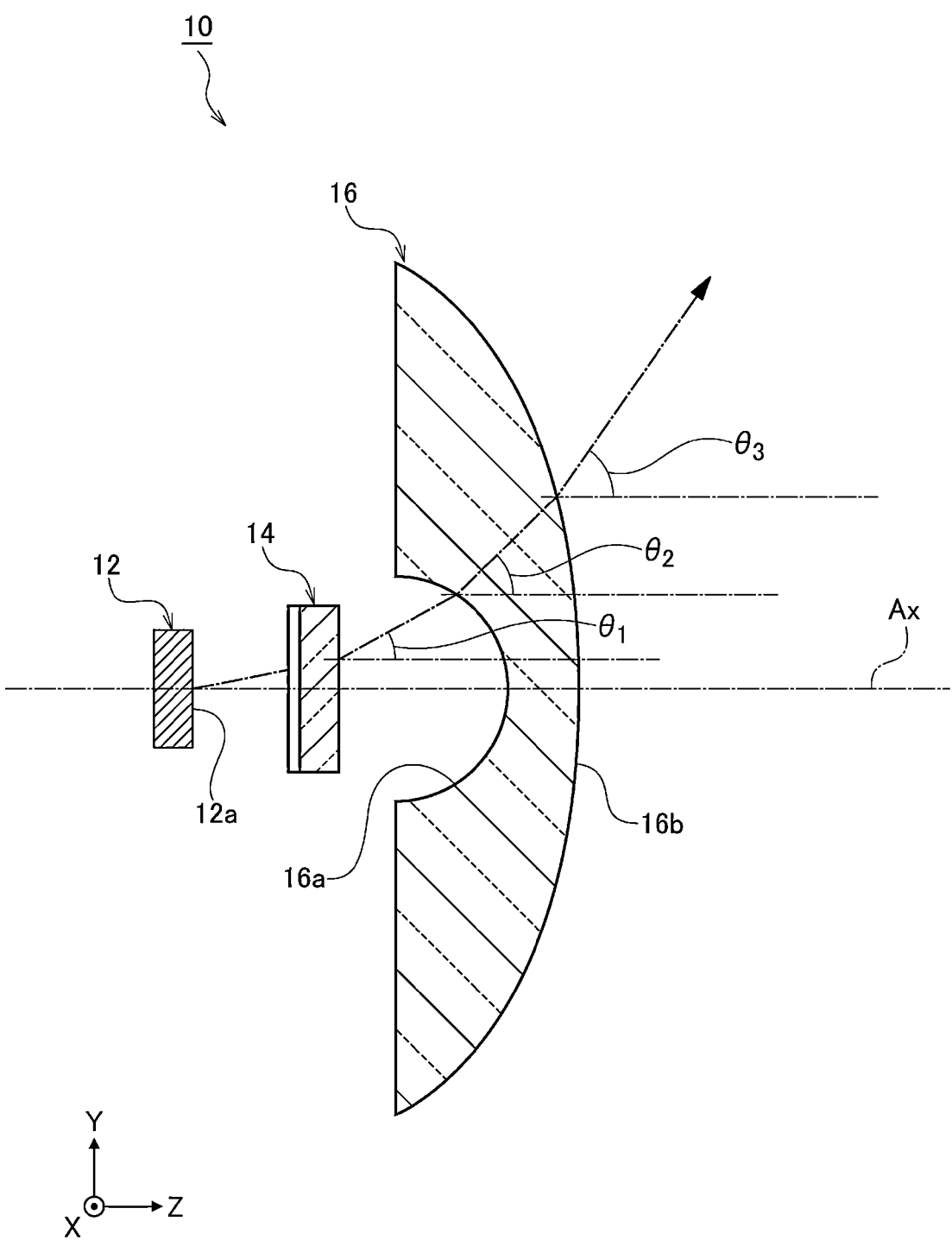
FIG. 3 is a diagram for defining angles of light emitted from components of the illumination device with respect to an optical axis.

FIG. 3 is a diagram for defining angles of light emitted from the components of the illumination device 10 with respect to the optical axis. As illustrated in FIG. 3, angles of the light emitted from the diffusion element 14 and the first surface 16a and the second surface 16b of the lens group 16 with respect to a Z axis are $\theta_1$, $\theta_2$, and $\theta_3$, respectively. When $\theta_1$ is less than 25° (less than 50° in the diffusion angle), the second surface 16b of the lens group 16 becomes a flat surface or a concave surface, and the reflectance at the interface becomes very large. As a result, light use efficiency of the entire illumination device 10 decreases. When $\theta_1$ exceeds 55° (exceeds 110° in the diffusion angle), an inclination angle of the lens surface in the microlens of the diffusion element 14 increases and the reflection loss increases, so that the light use efficiency of the entire illumination device 10 decreases. Therefore, $\theta_1$ is preferably 25° or more and 55° or less ($50° \leq 2 \times \theta_1 \leq 110°$).

When the angle of the emitted light of the illumination device 10 with respect to the optical axis Ax is $\theta_3$, a light distribution angle that is a maximum value of $2 \times \theta_3$ may be 160° or more and 180° or less.

Further, the illumination device 10 satisfies the following Formula (1) for $\theta_1$ to $\theta_3$.

$$\theta_2 - \theta_1 \leq \theta_3 - \theta_2 \tag{1}$$

A left side of Formula (1) represents a change amount in the angle of light on the first surface 16$a$ of the lens group 16, and a right side of Formula (1) represents a change amount in the angle of light on the second surface 16$b$ of the lens group 16. When a condition of Formula (1) is satisfied, the transmittance of the meniscus lens increases.

In a case where $\theta_1$ is small, the transmittance becomes maximum when $\theta_2 - \theta_1 = \theta_3 - \theta_2$ is satisfied. On the other hand, in a case where $\theta_1$ is large, when the condition of $\theta_2 - \theta_1 = \theta_3 - \theta_2$ is to be satisfied, the inclination angle of the first surface 16$a$ exceeds 90°, and it becomes difficult to manufacture the lens group 16. In that case, the optimum condition is that the inclination angle of the first surface 16$a$ is 90° or less and $\theta_2 - \theta_1$ is as close as possible to $\theta_3 - \theta_2$.

Furthermore, when the intensity of light emitted from the lens group 16 per unit solid angle is $F_3(\theta_3)$, the illumination device 10 satisfies the following Formula (2) for $F_3(\theta_3)$.

$$F_3(\theta_3) = (1 - R_{32}(\theta_2)) \times F_2(\theta_2) \times \Delta\theta_2 \times \sin \theta_2 / (\Delta\theta_3 \times \sin \theta_3) = (1 - R_{32}(\theta_2)) \times (1 - R_{21}(\theta_1)) \times F_1(\theta_1) \times \Delta\theta_1 \times \sin \theta_1 / (\Delta\theta_3 \times \sin \theta_3) = \text{constant} \tag{2}$$

Here, $R_{21}(\theta_1)$ is a reflection loss at the first surface 16$a$ of the lens group 16, $R_{32}(\theta_2)$ is a reflection loss at the second surface 16$b$ of the lens group, $F_1(\theta_1)$ is an intensity of light emitted from the diffusion element 14 per unit solid angle, and $F_2(\theta_2)$ is an intensity of light emitted from the second surface 16$b$ of the lens group 16 per unit solid angle. In addition, $\Delta\theta_1$, $\Delta\theta_2$, and $\Delta\theta_3$ are minute angles of $\theta_1$, $\theta_2$, and $\theta_3$, respectively.

Figure 4:
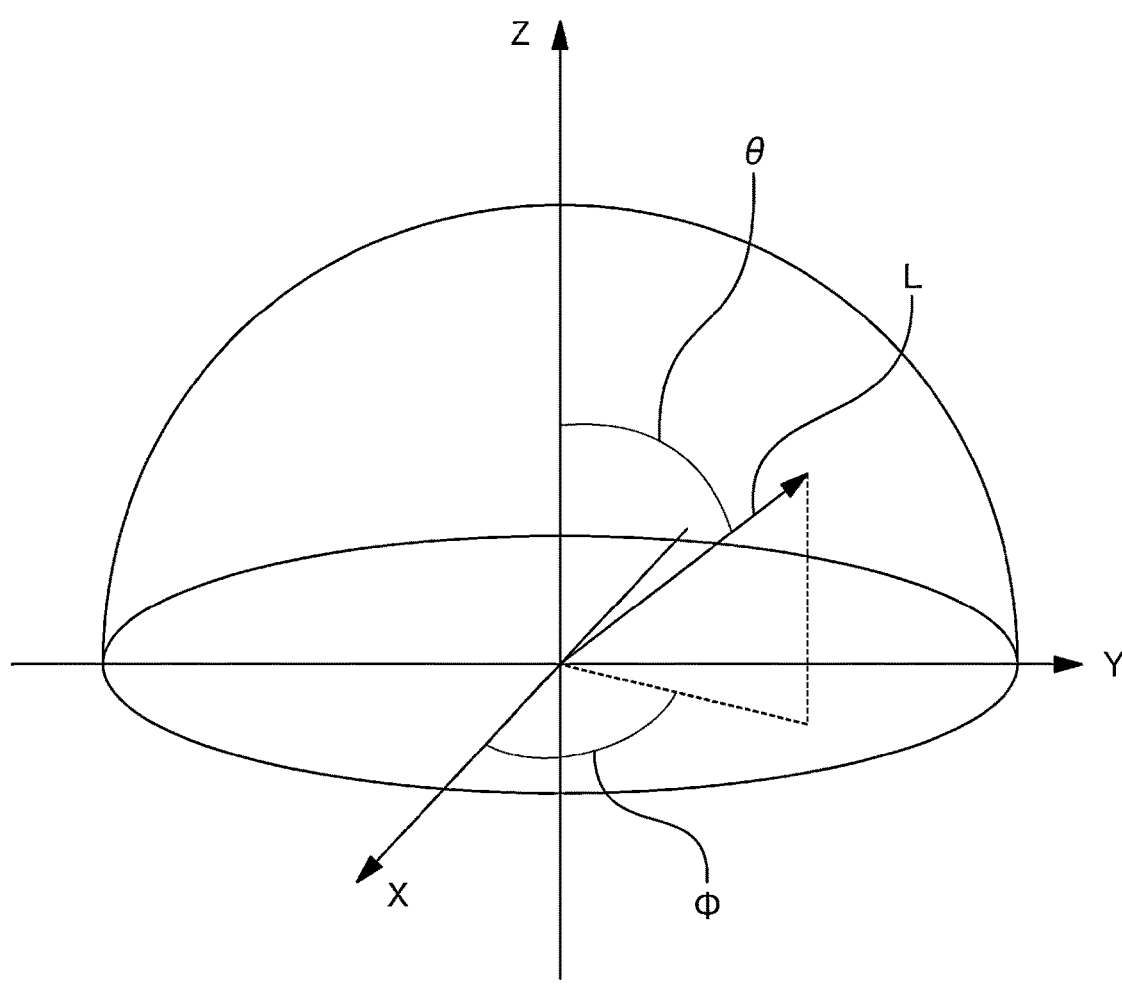
FIG. 4 is a diagram illustrating a relation between an angle of a light beam with respect to a Z axis and an azimuth angle of a light beam L.

In order to cause the intensity (luminous intensity) of light emitted from the illumination device 10 per unit solid angle to be constant, it is necessary to satisfy a relation of Formula (2). FIG. 4 is a diagram illustrating a relation between an angle $\theta$ of a light beam L with respect to the Z axis and an azimuth angle $\Phi$ of the light beam L. Formula (2) is based on the premise that $F_1(\theta_1)$, $F_2(\theta_2)$, and $F_3(\theta_3)$ are constant regardless of the azimuth angle $\Phi$.

In the illumination device 10, when the intensity of light emitted from the illumination device 10 per unit solid angle is $F_3(\theta_3)$, $F_3(\theta_3)$ may increase with an increase in $\theta_3$ while Formula (2) is satisfied.

In the illumination device, it may be desirable to change the light intensity according to $\theta_3$. For example, in a case where a monitoring device attached to a ceiling monitors a person below the monitoring device, a distance to a person immediately below the monitoring device is short, and a distance to a person obliquely below the monitoring device is long. At that time, a range that can be monitored can be expanded by increasing the intensity of light directed obliquely below rather than immediately below the illumination device attached downward. A function that increases with the increase in $\theta_3$ is not limited thereto, and examples thereof include a function represented by the following Formula (3A).

$$F_3(\theta_3) = (\cos \theta_3)^{-2} \tag{3A}$$

In addition, in order to correct a difference in sensitivity between the center and the peripheral portion of a light detector, it may be desirable to increase the light intensity of the illumination device as $\theta_3$ increases. Examples of the function that increases with the increase in $\theta_3$ include functions represented by the following Formulas (3B) and (3C).

$$F_3(\theta_3) = (\cos \theta_3)^{-4} \tag{3B}$$

$$F_3(\theta_3) = (\cos \theta_3)^{-n} \tag{3C}$$

Here, n represents a positive real number.

As the light source 12 used in the illumination device 10 according to the present embodiment, a light source having high directivity such as a surface emitting laser (VCSEL) or an edge emitting laser diode can be used. In addition, a combination of a light emitting element having low directivity such as an LED and a collimating lens can be used as the light source 12. The VCSEL or the laser may include an array in which a plurality of light emitting points or light emitting elements are arranged in one case. The light emitted from the light source 12 does not need to be completely collimated, and may be divergent light spreading to, for example, about 20°.

The light source 12 has a light emission surface (light emitting surface) 12$a$, and emits light from the light emission surface 12$a$ with a luminous intensity distribution in a predetermined angle. An axis along which the luminous intensity distribution is substantially symmetrical is defined as the optical axis Ax. The optical axis Ax may be perpendicular to the light emission surface 12$a$, may be perpendicular to a bottom surface of a part of a case of the light source 12, and may pass through the center of the light emission surface 12$a$. The light source 12 is usually disposed such that the optical axis Ax is parallel to the Z axis of orthogonal coordinate axes, and the illumination device 10 and the components included therein are described.

When a light emitting element including a semiconductor such as a laser or an LED is used as the light source 12, it is advantageous in that the light emitting element is small in size and power consumption is small. In addition, since responsiveness when modulation is applied is good, this point is more advantageous than a light source such as an incandescent lamp or a fluorescent lamp that emits light by, for example, resistance heating.

The structure of the diffusion element 14 is not limited as long as the diffusion element 14 receives the light emitted from the light source 12 and emits light with an expanded spread angle. As the diffusion element 14, a frosted diffusion plate having a shape of a flat plate made of glass, resin, or the like and having a roughened surface by grinding, polishing, or sandblasting, a corrosion-type diffusion plate having a surface corroded with hydrofluoric acid or the like and having a predetermined roughness, an opal-type diffusion plate having a surface of a flat plate made of glass or resin and having a milky white, white, or gray film formed on the surface, or the like can be used.

Furthermore, a substrate made of glass, resin, or the like and having a surface provided with an irregularity structure such as a large number of minute microlenses or microprisms can also be used as the diffusion element 14 from the viewpoint of good performance and control.

The diffusion element 14 including a microlens array has a surface on which minute lenses (microlenses) are randomly disposed or a surface on which cylindrical lenses are arranged. However, each microlens may be convex or concave, or a mixture of a convex lens and a concave lens.

The size of the microlens in the diffusion element 14 does not need to be uniform, and the height of the lens may also be different. As long as a predetermined diffusion angle is obtained and uniform light intensity is obtained in a necessary direction, an outer shape (plan view) when the microlens is viewed from the incidence side may be a polygon, a circle, an ellipse, or a mixture thereof. Further, a gap may be provided between the microlenses.

A diameter of each microlens in the diffusion element 14 may be several μm to several hundred μm, and may be, for example, 10 μm to 200 μm.

The microlens array in the diffusion element 14 may be a microlens array in which microlenses are formed using a mold using resin or glass as a material, a microlens array in which resin is poured into a mold and molded, a microlens array in which a surface of glass is etched with acid, a microlens array formed by forming minute irregularities by sandblasting, or the like. The microlens may be formed of a material that is transparent at a light wavelength of the light source 12, and does not need to be transparent at the other wavelengths.

FIGS. 5(a) and 5(b) are diagrams for explaining the diffusion element 14. FIG. 5(a) is a schematic front view of the diffusion element 14, and FIG. 5(b) is a schematic cross-sectional view taken along the line A-A of the diffusion element 14 illustrated in FIG. 5(a). FIG. 6 is a bird's-eye view illustrating a part of the diffusion element 14.

The diffusion element 14 is a microlens array including a plate 20 and a large number of microlenses 22 formed on a surface of the plate 20.

The diffusion element 14 illustrated here has a quadrangular shape in front view, but the shape thereof is not limited as long as the diffusion element has a size sufficient to receive light from the light source 12, and may be a circle, an ellipse, or the like in addition to a polygon.

In another embodiment of the diffusion element 14, the microlenses 22 may be formed on the front and rear principal surfaces of the plate 20, and in this case, diffusion efficiency can be improved. In addition, the microlens 22 may be formed on a surface of a refractive-type convex lens or concave lens, and in this case, the diffused light can be refracted, and the enlargement and reduction of the diffusion angle can be controlled. The diffusion element 14 may include these microlenses 22.

The diffusion element 14 may include fine particles (diffusive particles) having a size capable of scattering light inside the diffusion element 14 in addition to the microlenses 22, so that diffusing power of the diffusion element 14 can be improved. Even when a film containing diffusion particles is formed on the surface of the diffusion element 14 or the surface of the microlens 22, similar effects can be expected. The size of the fine particles capable of scattering light may be about 1 nm to 100 nm in a case of Rayleigh scattering, and may be equal to or more than 1 nm to 100 nm, or about 1 μm to 100 μm in a case of Mie scattering. Examples of the fine particles include resin such as PMMA, fine particles made of SiO2 or MgF2, and hollow particles thereof.

Furthermore, an antireflection film (including a thing that suppresses reflection even if the reflectance does not become substantially 0) for suppressing reflection and improving light transmittance may be formed on the surface of the diffusion element 14. By forming the antireflection film, the brightness of illumination by the illumination device 10 can be improved. The antireflection film is obtained by coating the surface of the diffusion element with an inorganic material such as MgF2, SiO2, TiO2, or Ta2O5 or a material such as a resin in a single layer or multiple layers. The antireflection film can also be obtained by coating a layer containing fine particles containing hollow or solid SiO2, MgF2, or the like in a binder. As a coating method, in addition to physical methods such as vacuum vapor deposition, sputtering, and ion plating, a method of applying a liquid precursor of a film to a surface and drying the liquid precursor can be used.

The lens group 16 includes a lens system that receives light emitted at a predetermined spread angle by the diffusion element 14 and expands the spread angle to emit light. The lens system having a function of expanding the spread angle is generally a concave lens system. The concave lens system is a lens system having negative power. The lens group 16 includes one or more lenses, and may include a lens group in which surfaces are bonded to each other. In the adjacent lenses, a layer having a refractive index different from that of the lens may be included between the surfaces.

In a case where the lens group 16 includes one axisymmetric lens (single lens), a plano-concave lens, a biconcave lens, a concave-convex lens, and the like can be exemplified. A part of the concave-convex lens may be referred to as a meniscus lens, and the meniscus lens having negative power may be particularly a meniscus lens in which a thickness of a peripheral portion is larger than a thickness of a center portion. The meniscus lens has a part of functions action of a concave lens and a convex lens, it is generally known that spherical aberration can be caused to be smaller than that of a plano-concave lens or the like, and there is an advantage in that a spread angle thereof can be easily controlled.

The lens group 16 may be formed of a material that is transparent at a light wavelength of the light source 12, does not need to be transparent at the other wavelengths, and may be formed using resin or glass as a material.

In addition, in a case where a meniscus lens is used as the lens group 16, by including fine particles (diffusion particles) having a size capable of scattering light in the lens, it is possible to expand the spread angle by the lens group 16 by the light diffusion action. Even when a film containing diffusion particles is formed on the lens surface, similar effects can be expected. The size of the fine particles capable of scattering light is as described above. The fine particles may be colorless or transparent fine particles, and in addition to a resin such as PMMA, fine particles made of SiO2 or MgF2 can be used, and these hollow particles can also be used.

Furthermore, an antireflection film (including a thing that suppresses reflection even if the reflectance does not become substantially 0) for suppressing reflection and improving light transmittance may be formed on the surface of the lens group 16. By forming the antireflection film, the brightness of illumination by the illumination device 10 can be improved. The antireflection film is obtained by coating the surface of the lens with an inorganic material such as MgF2, SiO2, TiO2, or Ta2O5 or a material such as a resin in a single layer or multiple layers. The antireflection film can also be obtained by coating a layer containing fine particles containing hollow or solid SiO2, MgF2, or the like in a binder. As a coating method, in addition to physical methods such as vacuum vapor deposition, sputtering, and ion plating, a method of applying a liquid precursor of a film to a surface and drying or curing the liquid precursor to fix the film can be used.

The illumination device 10 according to the embodiment of the present invention includes the light source 12, the diffusion element 14 that receives light emitted from the light source 12 and emits the light at a predetermined spread angle, and the lens group 16 that receives the light emitted from the diffusion element 14 and emits the light at an expanded predetermined spread angle.

Figure 5:
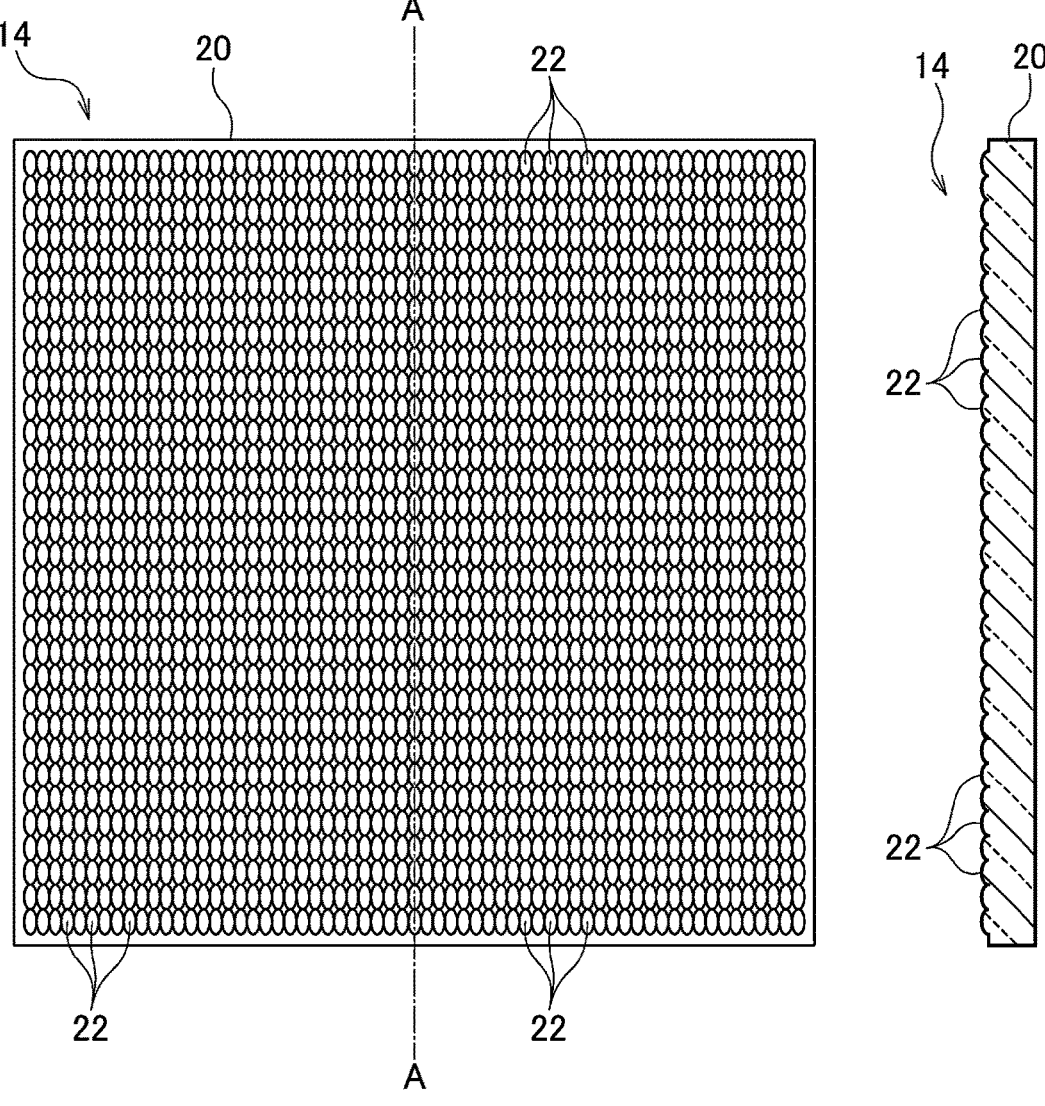
FIGS. 5(a) and 5(b) are diagrams for explaining a diffusion element.
Figure 6:
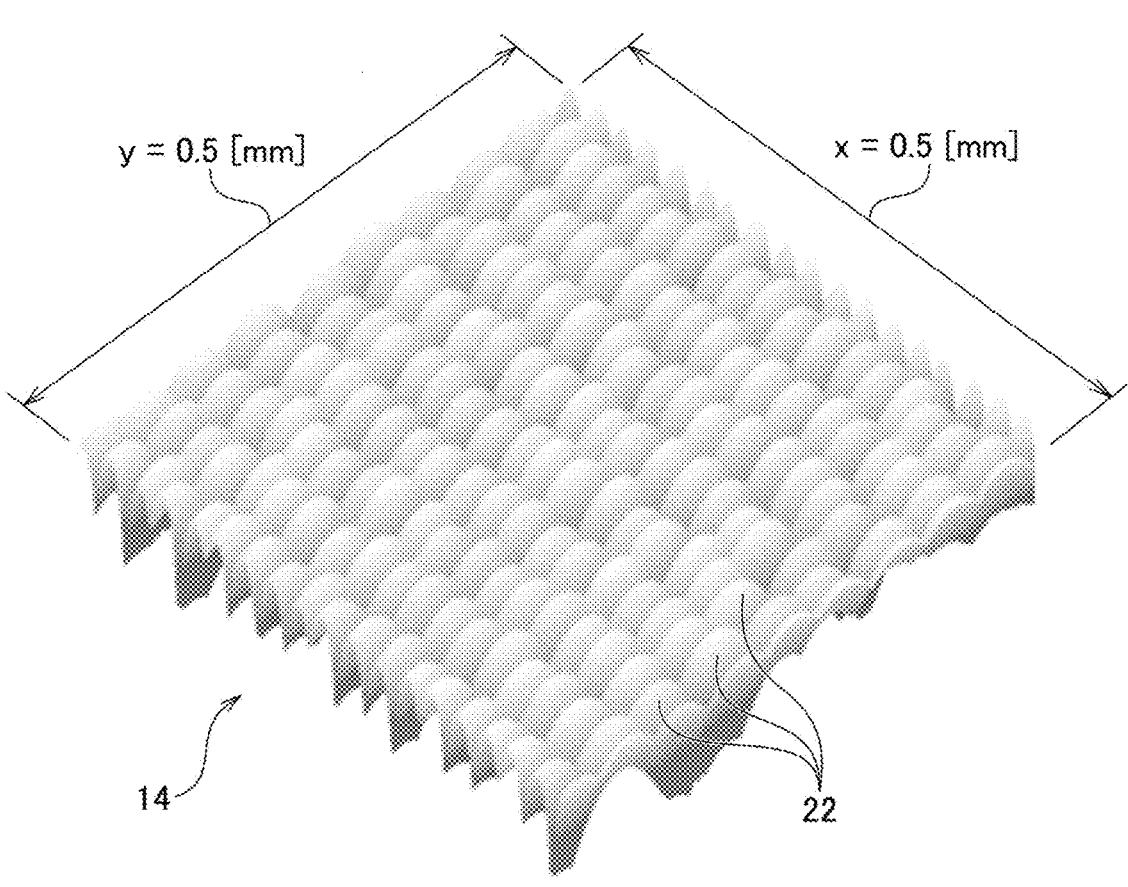
FIG. 6 is a bird's-eye view illustrating a part of the diffusion element.

The illumination device 10 in which a laser (VCSEL array; light emitting points of a large number of VCSEL-type semiconductor lasers are arranged in an array and integrated in a case) having a light emission surface of about 1 mm×1 mm is used as the light source 12, a microlens array having a substantially flat shape as illustrated in FIG. 5(*a*) is used as the diffusion element 14, and one axisymmetric meniscus lens is used as the lens group 16 will be described as an example.

The light source 12 is disposed in a space including the orthogonal coordinate axes such that the optical axis Ax is parallel to the Z direction (the optical axis Ax may be the Z axis). The diffusion element 14 is disposed such that the optical axis Ax of the light source 12 passes through the geometric center of the diffusion element 14 and light is received from the light source 12. At this time, a light receiving surface of the diffusion element 14 preferably has a size sufficient to receive the light emitted from the light source 12 in a necessary range or almost all the light. When a large number of microlenses are formed on one surface of a substantially parallel flat plate, the surface on which the microlenses are formed may be used as the light receiving surface, or a surface facing the surface may be used as the light receiving surface. The diffusion element 14 including a microlens array has a size of 0.25 mm×0.25 mm to 5 mm×5 mm in plan view, has a substantially parallel flat plate shape with a thickness of 0.1 mm to 3 mm, and has a large number of microlenses formed on at least one surface. The size of each microlens is 2.5 μm to 100 μm, and the Sag amount (height of the microlens) is 5 μm to 500 μm.

In a case where one axisymmetric meniscus lens is used as the lens group 16, the meniscus lens 16 is disposed such that the symmetry axis of the lens (which may be the optical axis of the lens) is matched with the axis Ax of the light source and a surface having a concave shape faces the diffusion element 14. The meniscus lens 16 has, for example, a diameter of 5 mm to 50 mm and a center thickness of 0.25 mm to 15 mm.

Furthermore, the illumination device 10 may include a housing (not illustrated) that integrally holds these components and other components.

Hereinafter, the shape of the meniscus lens 16 will be described. The light incident on the diffusion element 14 from the light source 12 is diffused by the microlenses or the like arranged in the diffusion element 14 and spreads in a predetermined range. As illustrated in FIGS. 1 and 2, the light emitted from the diffusion element 14 spreads inside a cone, a pyramid, a truncated cone, or a truncated pyramid that is substantially symmetric with respect to the optical axis Ax.

The intensity of the light emitted from the diffusion element 14 may change depending on the angle ($\theta_1$) formed with the Z axis, but it is desirable that the light intensity is constant regardless of $\theta_1$ because it is easy to design the meniscus lens 16 at the subsequent stage (rear lens).

On the other hand, the light intensity may be constant in a direction (Φ direction) rotating about the Z axis. In a case where the shape of the meniscus lens 16 at the subsequent stage has an axisymmetric shape with respect to the Z axis, when the light intensity after passing through the diffusion element 14 is constant for each Φ, it is advantageous since it is not necessary to perform correction in the lens group 16 at the subsequent stage in order to cause the illumination light from the illumination device to be uniform.

For the light emitted from the diffusion element 14, an angle ($\theta_1$) formed by the light emitted from the diffusion element 14 and the Z axis (optical axis Ax) is defined as a divergence angle. In a case where the divergence angle dependence of the intensity of the light emitted from the diffusion element 14 is considered, assuming that the maximum intensity is Io (here, assuming that the intensity at ($\theta_1$=0°) on the optical axis Ax is maximized), a total width (full width at half maximum) of an angle of ½×Io is defined as a diffusion angle. In a case where the maximum intensity Io is not on the optical axis Ax (for example, a case where the light intensity distribution has a toroidal shape or a Bat-Wing shape, or the like), a difference between a maximum value and a minimum value of the angle corresponding to the intensity of ½×Io is defined as the diffusion angle. The diffusion angle of the diffusion element 14 including the microlenses is preferably 50° or more and 110° or less. If the diffusion angle is less than 50°, the reflection loss on the lens surface when light is spread by the meniscus lens 16 at the subsequent stage increases, and if the diffusion angle exceeds 110°, the reflection loss in the diffusion element 14 increases, and the total amount of light emitted from the illumination device 10 decreases.

The light spread to a predetermined diffusion angle by the diffusion element 14 is incident on the first surface (light receiving surface) 16a of the meniscus lens 16 and is refracted to increase the divergence angle. The light reaches the second surface (emission surface) (16b) from the inside of the lens, is refracted, and is emitted.

Here, tracking of the light beam emitted from the light source 12 is considered. As illustrated in FIG. 3, it is assumed that the light emitted from the light emission surface 12a of the light source 12 (for example, the light beam parallel to the optical axis Ax) is spread to an angle of the divergence angle $\theta_1$ by the diffusion element 14, spread to $\theta_2$ by the first surface 16a of the meniscus lens 16, and spread to $\theta_3$ by the second surface 16b of the meniscus lens 16. $\theta_1$ to $\theta_3$ are angles formed with the Z axis (optical axis).

When the light intensity distribution emitted from the diffusion element 14 is symmetric with respect to the Z axis, a maximum value ($\theta_{1\ max}$) of $\theta_1$ becomes ½ of the diffusion angle of the diffusion element 14. Similarly, maximum values $\theta_{2max}$ and $\theta_{3\ max}$ of divergence angles of the first surface 16a and the second surface 16b of the meniscus lens 16 are also ½ of the diffusion angles of the first surface 16a and the second surface 16b of the meniscus lens 16, respectively.

Figure 7:
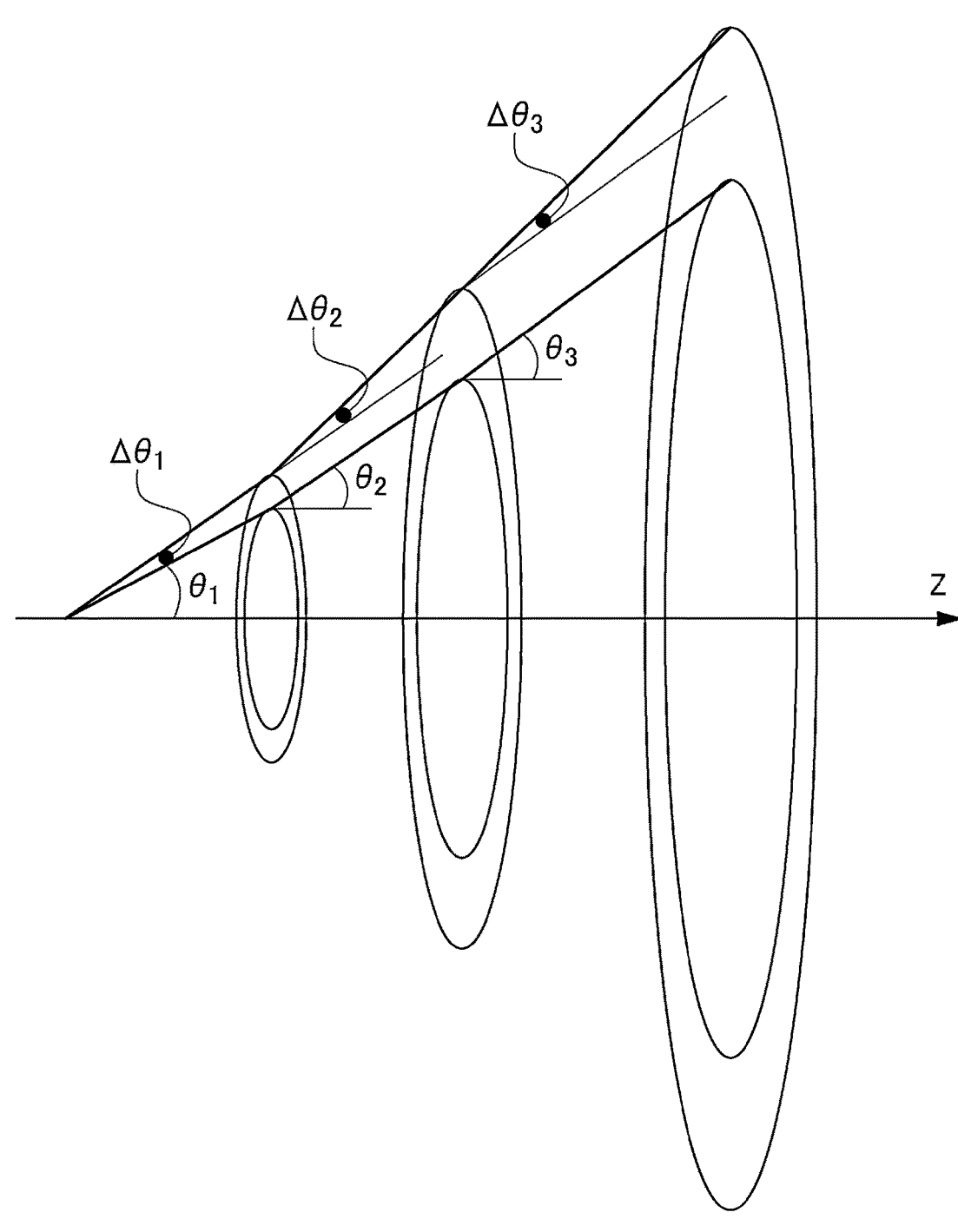
FIG. 7 is a conceptual diagram illustrating a light flux emitted from the diffusion element.

FIG. 7 is a conceptual diagram illustrating a light flux emitted from the diffusion element 14. Consideration is given to light included in an annulus having divergence angles of $\theta_1$ and $\theta_1+\Delta\theta_1$ (where $\Delta\theta_1$ is a minute angle) emitted from the diffusion element 14. The light intensity distribution after passing through the diffusion element 14 is defined as $F_1(\theta_1)$. Since the light intensity distribution is symmetric with respect to the Z axis, $F_1(\theta_1)$ is constant even if the azimuth (Φ) changes.

As illustrated in FIG. 7, light energy $E_1(\theta_1)$ passing through the annulus of $\theta_1$ and $\theta_1+\Delta\theta_1$ is represented by the following Formula (4) when $\Delta\theta_1$ is sufficiently small.

$$E_1(\theta_1)=F_1(\theta_1)\cdot\Delta\theta_1\cdot r_1\cdot(2\Pi r_1)\sim\sin\theta_1/ \\ (4\Pi\cdot r_1^2)\cdot 4\Pi=2\Pi\cdot F_1(\theta_1)\cdot\Delta\theta_1\cdot\sin\theta_1 \qquad (4)$$

Similarly, after passing through the first surface 16a of the meniscus lens 16, light energy $E(\theta_2)$ passing through an annulus of $\theta_2$ and $\theta_2+\Delta\theta_2$ is represented by the following Formula (5) when $\Delta\theta_2$ is sufficiently small.

$$E_2(\theta_2)=2\Pi\cdot F_2(\theta_2)\cdot\Delta\theta_2\cdot\sin\theta_2 \qquad (5)$$

Similarly, after passing through the second surface 16b of the meniscus lens 16, light energy $E_3(\theta_3)$ passing through an annulus of $\theta_3$ and $\theta_3 + \Delta\theta_3$ is represented by the following Formula (6) when $\Delta\theta_3$ is sufficiently small.

$$E_3(\theta_3) = 2\Pi \cdot F_3(\theta_3) \cdot \Delta\theta_3 \cdot \sin\theta_3 \qquad (6)$$

Reflection loss occurs on the first surface 16a and the second surface 16b of the meniscus lens 16. When the reflection loss occurring on the first surface 16a is $R_{21}(\theta_1)$ and the reflection loss occurring on the second surface 16b is $R_{32}(\theta_2)$, the following Formulas (7) and (8) are established.

$$(1 - R_{21}(\theta_1)) \cdot F_1(\theta_1) \cdot \Delta\theta_1 \cdot \sin\theta_1 = F_2(\theta_2) \cdot \Delta\theta_2 \cdot \sin\theta_2 \qquad (7)$$

$$(1 - R_{32}(\theta_2)) \cdot F_2(\theta_2) \cdot \Delta\theta_2 \cdot \sin\theta_2 = F_3(\theta_3) \cdot \Delta\theta_3 \cdot \sin\theta_3 \qquad (8)$$

From these, the following Formula (9) is established.

$$(1 - R_{32}(\theta_2)) \cdot (1 - R_{21}(\theta_1)) \cdot F_1(\theta_1) \cdot \Delta\theta_1 \cdot \sin\theta_1 = (1 - R_{32}(\theta_2)) \cdot F_2(\theta_2) \cdot \Delta\theta_2 \cdot \sin\theta_2 = F_3(\theta_3) \cdot \Delta\theta_3 \cdot \sin\theta_3 \qquad (9)$$

When Formula (9) is represented for $F_3(\theta_3)$, the following Formula (10) is obtained.

$$F_3(\theta_3) = (1 - R_{32}(\theta_2)) F_2(\theta_2) \cdot \Delta\theta_2 \cdot \sin\theta_2 / (\Delta\theta_3 \cdot \sin\theta_3) = (1 - R_{32}(\theta_2))(1 - R_{21}(\theta_1)) \cdot F_1(\theta_1) \cdot \Delta\theta_1 \cdot \sin\theta_1 / (\Delta\theta_3 \cdot \sin\theta_3) \qquad (10)$$

In order to cause the luminous intensity from the illumination device 10 to be constant, it is necessary to set each parameter such that $F_3(\theta_3)$ represented by Formula (10) becomes a constant value.

On the other hand, in order to increase $F_3(\theta_3)$ when $\theta_3$ increases, $F_3(\theta_3)$ may be a function that monotonically increases while satisfying Formula (10). As an example of such a function, a function shown in the following Formula (11) or Formula (12) or a function shown in the above Formula (3C) is considered.

$$F_3(\theta_3) = (\cos\theta_3)^{-2} \qquad (11)$$

$$F_3(\theta_3) = (\cos\theta_3)^{-3} \qquad (12)$$

In a case where loss due to reflection is suppressed by applying AR (antireflection) coating or the like to the lens surface of the meniscus lens 16, when the reflection loss is negligible, the above Formula (10) obtained for $F_3(\theta_3)$ becomes the following Formula (13).

$$F_3(\theta_3) = F_2(\theta_2) \cdot \Delta\theta_2 \cdot \sin\theta_2 / (\Delta\theta_3 \cdot \sin\theta_3) = F_1(\theta_1) \cdot \Delta\theta_1 \cdot \sin\theta_1 / (\Delta\theta_3 \cdot \sin\theta_3) \qquad (13)$$

If $F_3(\theta_3) =$ constant value is set, uniform illumination is obtained, and if $F_3(\theta_3)$ is set to a function that increases as $\theta_3$ increases, the illumination device 10 in which the radiation intensity changes according to the function is obtained.

Formula (13) determines the shape of the lens surface of the meniscus lens 16 for various $F_1(\theta_1)$, $F_2(\theta_2)$, and $F_3(\theta_3)$. For example, when $F_1(\theta_1)$ is constant regardless of $\theta_1$ and $F_3(\theta_3)$ is also constant regardless of $\theta_3$, the following Formula (14) is obtained from Formula (13).

$$\Delta\theta_3 \cdot \sin\theta_3 = C \cdot \Delta\theta_1 \cdot \sin\theta_1 \qquad (14)$$

Here, C is a constant.

At $\theta_1 = 0$, since the light beam travels in parallel with the Z axis, $\theta_3 = 0$ is satisfied. At $\theta_1 = \Delta\theta_1$, $\Delta\theta_3$ is obtained from Formula (14), and $\theta_{3(1)}$ is obtained as $\theta_{3(k)} = \theta_{3(k-1)} + \Delta\theta_{3(k)}$ (in a case of k=1, since $\theta_{3(1-1)} = 0$ is satisfied, $\theta_{3(1)} = 0 + \Delta\theta_3 = \Delta\theta_3$ is satisfied). By calculating $\Delta\theta_3$ by the above Formula while increasing $\theta_1$ by $\Delta\theta_1$ and adding it to the previous $\theta_3$ as $\theta_{3(k)} = \theta_{3(k-1)} + \Delta\theta_{3(k)}$, $\theta_3$ corresponding to $\theta_1$ can be sequentially obtained from the center of the meniscus lens 16 toward the outside. The constant C is determined so as to be a target $\theta_3$ at a predetermined $\theta_1$. In this way, $\theta_3$ corresponding to $\theta_1$ is obtained. Even when there is the reflection loss on the lens surface of the meniscus lens 16 or when $F_3(\theta_3)$ is not constant, $\theta_3$ corresponding to $\theta_1$ can be similarly obtained by using Formulas (11) and (12). At this time, since $\theta_2$ is not particularly defined, $\theta_2$ can take various values. For example, in a case of $\theta_2 = \theta_1$, the light is not spread at all on the first surface 16a of the meniscus lens 16, and the light is largely bent on the second surface 16b. Furthermore, a case of $\theta_2 < \theta_1$ is also established in a mathematical expression. At this time, the light spread to $\theta_1$ is once narrowed to $\theta_2$ and again spread, and the reflection loss on the lens surface increases, so that the transmittance greatly decreases.

The shapes of the first surface 16a and the second surface 16b of the meniscus lens 16 can be obtained by tracking of the light beam when $\theta_1$, $\theta_2$ corresponding to $\theta_1$, and $\theta_3$ corresponding to $\theta_2$ are determined. Hereinafter, a method will be briefly described.

Assuming that the meniscus lens 16 is rotationally symmetric with respect to the Z axis, the tangential plane of the lens surface and the Z axis are orthogonal at the intersection of the Z axis and the meniscus lens 16. Therefore, at $\theta_1 = 0$, the light is perpendicularly incident on the lens surface of the meniscus lens 16.

The light incident on the first surface 16a of the meniscus lens 16 at the angle of $\theta_1 = \Delta\theta_1$ is refracted by the surface and travels in the direction of $\theta_2$. At this time, an incidence angle on the lens surface is uniquely determined according to the law of refraction, and an angle formed by the lens surface and the Z axis at that time is also uniquely determined. Similarly, while $\theta_1$ is increased by $\Delta\theta_1$, the angle formed by the lens surface through which the light passes and the Z axis can be calculated, and as a result, all inclination angles of the lens surface through which the light passes at the angle of $\theta_1$ are obtained.

The inclination angle of the lens surface at the center of the meniscus lens 16 is determined. For this reason, if the lens coordinates are determined so that the lens surfaces are smoothly connected from the coordinates toward the outer peripheral direction, that is, a differential coefficient of the lens surface continuously changes, the surface shape of the meniscus lens 16 can be determined. For the second surface 16b of the meniscus lens 16, the shape of the lens surface can be determined by similar calculation.

As described above, even if $\theta_1$ and $\theta_3$ are determined, there is arbitrariness in $\theta_2$, so that the shape of the meniscus lens 16 is infinite for a certain combination of $\theta_1$ and $\theta_3$. Therefore, when the meniscus lens 16 is designed, it is necessary to determine optimum $\theta_2$.

The optimum $\theta_2$ can be determined by the following method. On the first surface 16a of the meniscus lens 16, the light traveling direction is deflected by $\theta_2 - \theta_1$. A deflection angle $\Delta\theta_{21}$ at this time is defined by $\Delta\theta_{21} = \theta_2 - \theta_1$. Similarly, a deflection angle $\Delta\theta_{32}$ at the second surface 16b of the meniscus lens 16 is defined as $\Delta\theta_{32} = \theta_3 - \theta_2$. From FIGS. 1 and 4, a relation of the following Formula (15) is established.

$$\theta_3 = \theta_1 + \Delta\theta_{21} + \Delta\theta_{32} \qquad (15)$$

Formula (15) represents that the light spread to $\theta_1$ by the diffusion element 14 is spread more by $\Delta\theta_{21}$ on the first surface 16a of the meniscus lens 16, and is further spread by $\Delta\theta_{32}$ on the second surface 16b of the meniscus lens 16.

Of the divergence angle $\theta_3$ of the illumination device 10, the amount deflected by the diffusion element 14 and the first surface 16a and the second surface 16b of the meniscus lens

16 is defined as a contribution ratio of each element by the following Formulas (16) to (18).

$$\eta_1 = \theta_1/\theta_3 \tag{16}$$

$$\eta_{21} = \Delta\theta_{21}/\theta_3 \tag{17}$$

$$\eta_{32} = \Delta\theta_{32}/\theta_3 \tag{18}$$

It is clear that the sum of $\eta_1$, $\eta_{21}$ and $\eta_{32}$ is 1. In addition, it is assumed that these contribution ratios do not change even when $\theta_3$ changes. Assuming that $\theta_3$ is constant, the light radiation efficiency of the illumination device 10 is calculated with various combinations of $\eta_1$, $\eta_{21}$, and $\eta_{32}$. The light radiation efficiency represents light energy radiated from the illumination device 10 through the meniscus lens 16 when light energy radiated from the light source 12 is set to 1. The light energy is obtained by integrating light energy radiated not only in a certain $\theta_3$ direction but also in all directions.

Figure 8:
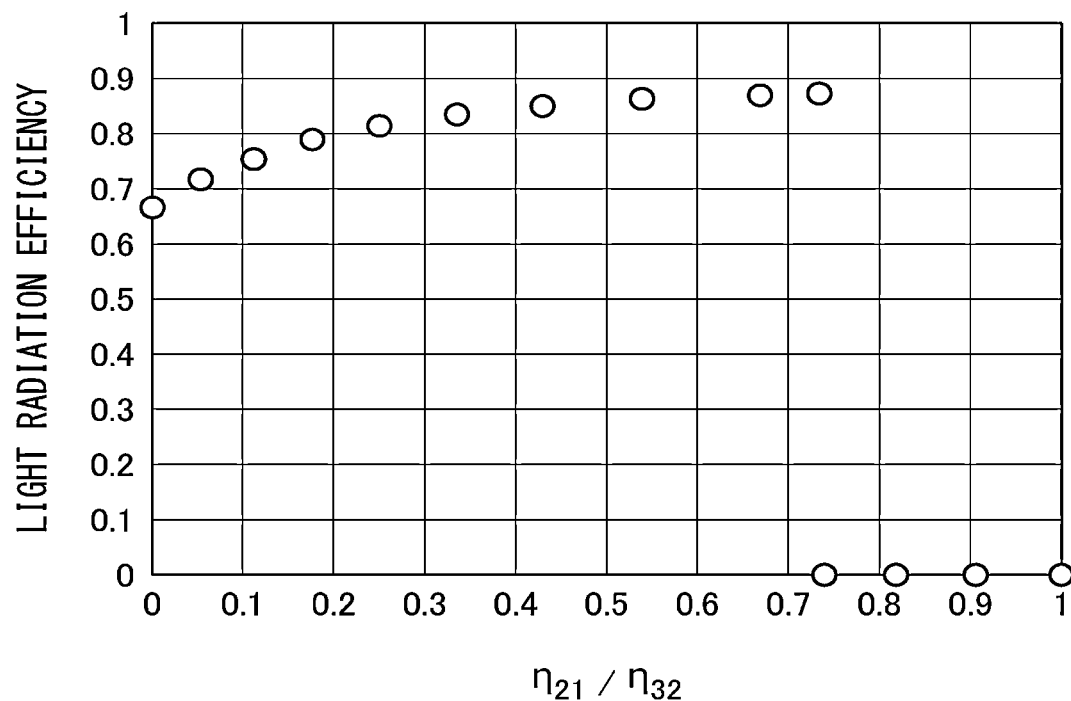
FIG. 8 is a diagram illustrating an example of a calculation result of light radiation efficiency of the illumination device.

FIG. 8 illustrates an example of a calculation result of the light radiation efficiency of the illumination device 10. In FIG. 8, a vertical axis of a graph represents light radiation efficiency, and a horizontal axis of the graph represents $\eta_{21}/\eta_{32}$. When $\theta_{1\ max}=40°$ and $\theta_{3\ max}=90°$ are satisfied, the light radiation efficiency was calculated for various $\eta_{21}$ and $\eta_{32}$. In this example, $\eta_1=40/90=0.44$ and $\eta_{21}+\eta_{32}=0.56$ are obtained.

From FIG. 8, it can be seen that the light radiation efficiency increases as $\eta_{21}/\eta_{32}$ increases, and the light radiation efficiency is maximized when $\eta_{21}/\eta_{32}$ is about 0.74. In this calculation example, a refractive index of the meniscus lens 16 is 1.586, and a light distribution of the radiation light is uniform (where $F_3(\theta_3)$=constant).

In a case of $\eta_{21}/\eta_{32}>0.74$, the light radiation efficiency is 0, which means that the inclination angle of the first surface of the meniscus lens is 90° or more, and it is difficult to manufacture the lens, so that it is in a range that cannot be realized.

Figure 9:
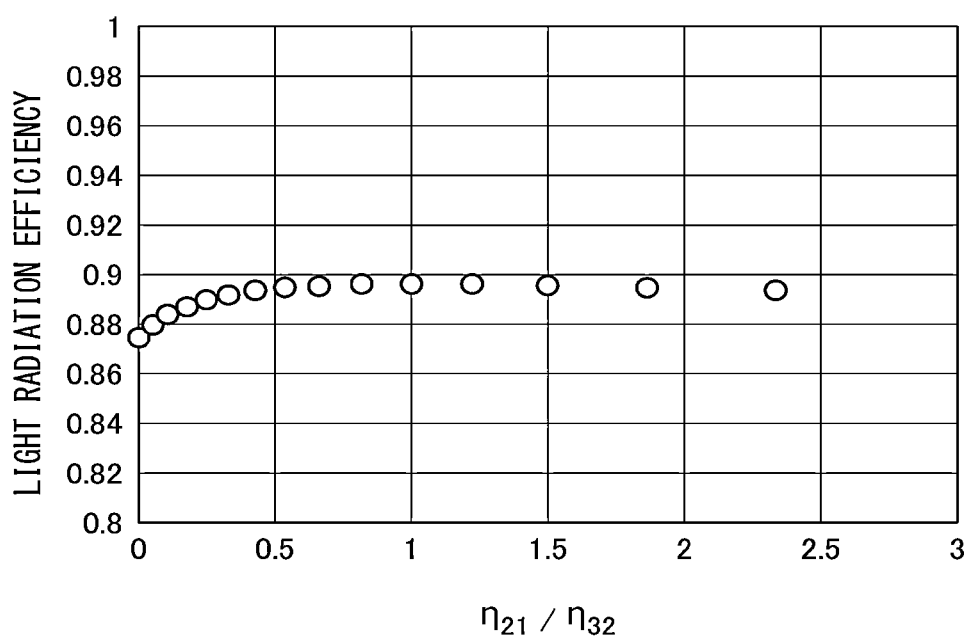
FIG. 9 is a diagram illustrating another example of a calculation result of light radiation efficiency of the illumination device.

FIG. 9 illustrates another example of the calculation result of the light radiation efficiency of the illumination device 10. Here, when $\theta_{1\ max}=40°$ and $\theta_{3\ max}=70°$ are satisfied, the light radiation efficiency was calculated for various $\eta_{21}$ and $\eta_{32}$. In this example, $\eta_1=40/70=0.57$ and $\eta_{21}+\eta_{32}=0.43$ are obtained.

In the example illustrated in FIG. 9, an angle to be deflected by the meniscus lens 16 is smaller than that in the example illustrated in FIG. 8. In the example illustrated in FIG. 9, it can be seen that as $\eta_{21}/\eta_{32}$ increases, the light radiation efficiency increases, takes a maximum value at $\eta_{21}/\eta_{32}=1$, and decreases again at the time of exceeding 1. Unlike the example illustrated in FIG. 8, under the condition of the example illustrated in FIG. 9, the inclination angle of the first surface 16a of the meniscus lens 16 does not exceed 90°, so that the meniscus lens 16 can be manufactured in a wide range of $\eta_{21}/\eta_{32}$.

Even in other combinations of $\theta_1$, $\theta_2$, and $\theta_3$, the light radiation efficiency of the illumination device 10 can be similarly calculated, and when conditions under which the light radiation efficiency is maximized are obtained for each combination, $$\eta_{21} \leq \eta_{32} \tag{19}$$

is satisfied.

However, an equal sign in Formula (19) is established when the inclination angle of the first surface 16a of the meniscus lens 16 is 90° or less, and represents that the light radiation efficiency increases when $\eta_{21}$ is increased as much as possible in a range in which the inclination angle of the first surface 16a of the meniscus lens 16 does not exceed 90°.

When Formula (19) is represented by an angle, $$\Delta\theta_{21}/\theta_3 \leq \Delta\theta_{32}/\theta_3 \tag{20}$$

or $$\theta_2-\theta_1 \leq \theta_3-\theta_2 \tag{21}$$

becomes an optimum condition.

With reference to Formulas (20) and (21), it is possible to determine $\theta_2$ where the light radiation efficiency is highest for different $\theta_1$ and $\theta_3$. For example, at $\theta_1=40°$ and $\theta_3=90°$, the light radiation efficiency of the illumination device 10 is maximized when $\eta_{21}/\eta_{32}=0.74$ is satisfied from FIG. 8. If $\theta_2$ is calculated from relations of $$\eta_{21} = \Delta\theta_{21}/\theta_3 = (\theta_2-\theta_1)/\theta_3 \tag{22}$$

and $$\eta_{32} = \Delta\theta_{32}/\theta_3 = (\theta_3-\theta_2) \tag{23},$$

$\theta_2=61.26°$ is obtained. Further, when $\theta_1=40°$ and $\theta_3=70°$ are satisfied, the light radiation efficiency of the illumination device 10 is maximized when $\eta_{21}/\eta_{32}=1$ is satisfied from FIG. 9. If $\theta_2$ at this time is calculated, $\theta_2=55°$ is obtained.

Figure 10:
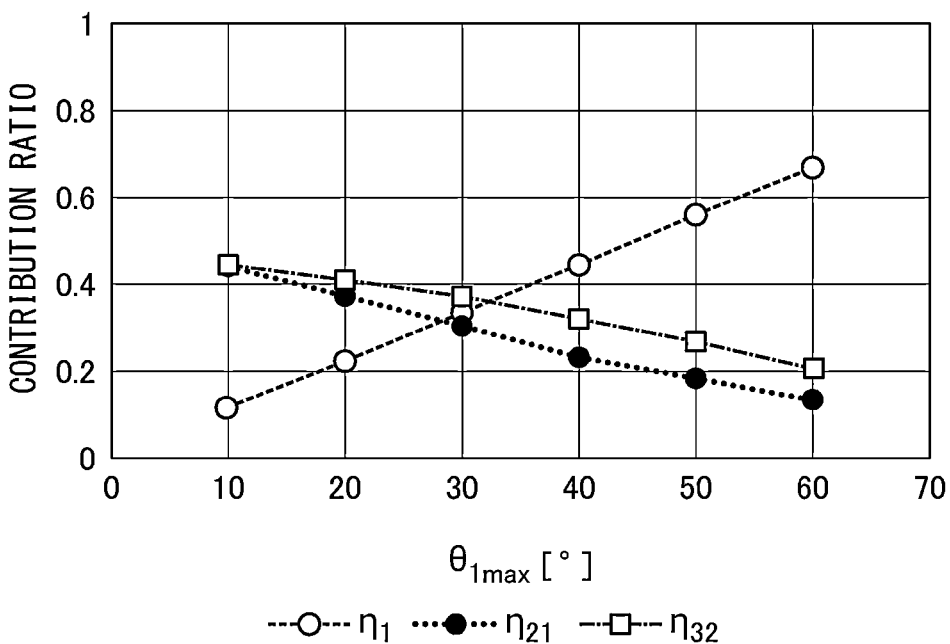
FIG. 10 is a diagram illustrating a change in contribution ratio when $\theta_{1\ max}$ changes at $\theta_{3\ max}$=90°.
Figure 11:
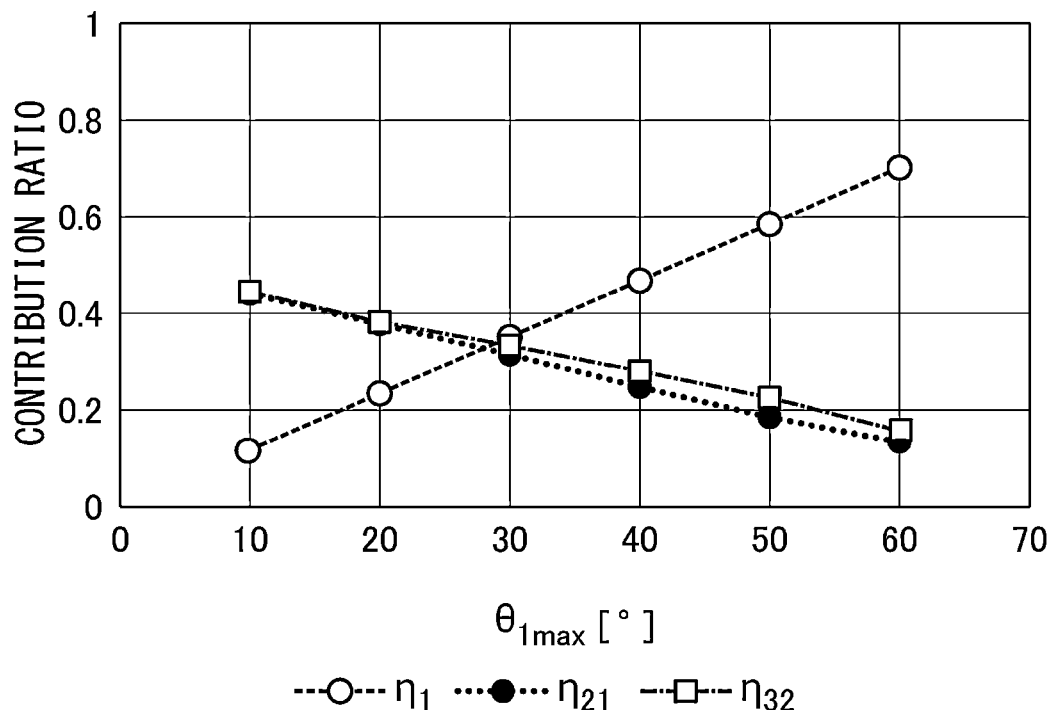
FIG. 11 is a diagram illustrating a change in contribution ratio when $\theta_{1\ max}$ changes at $\theta_{3\ max}$=85°.
Figure 12:
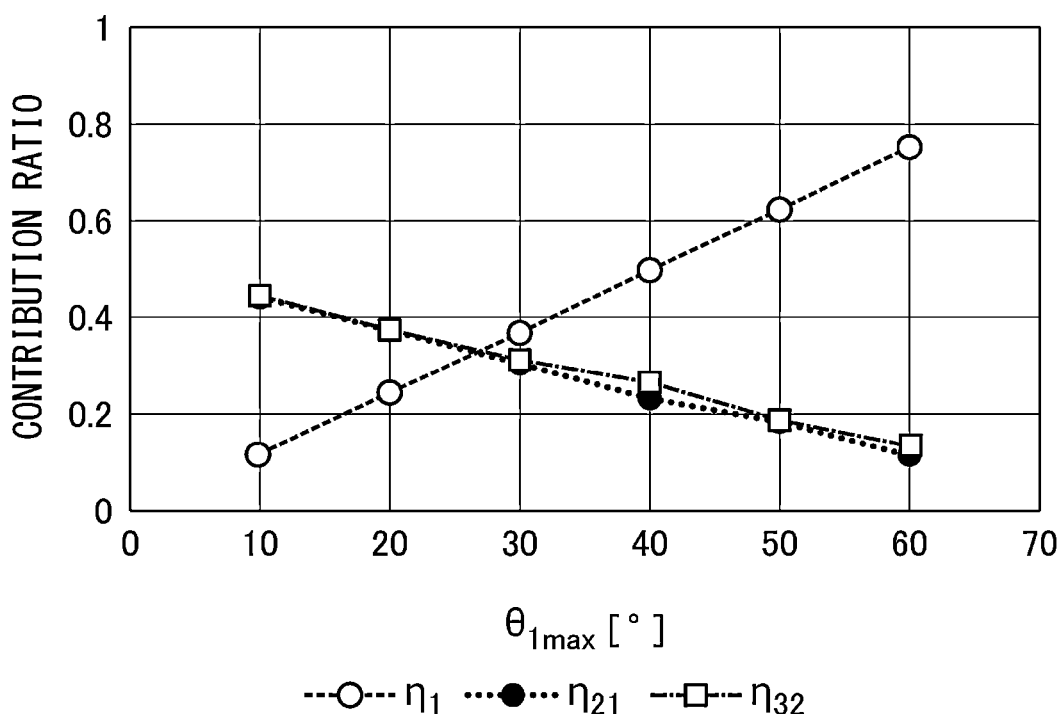
FIG. 12 is a diagram illustrating a change in contribution ratio when $\theta_{1\ max}$ changes at $\theta_{3\ max}$=80°.
Figure 13:
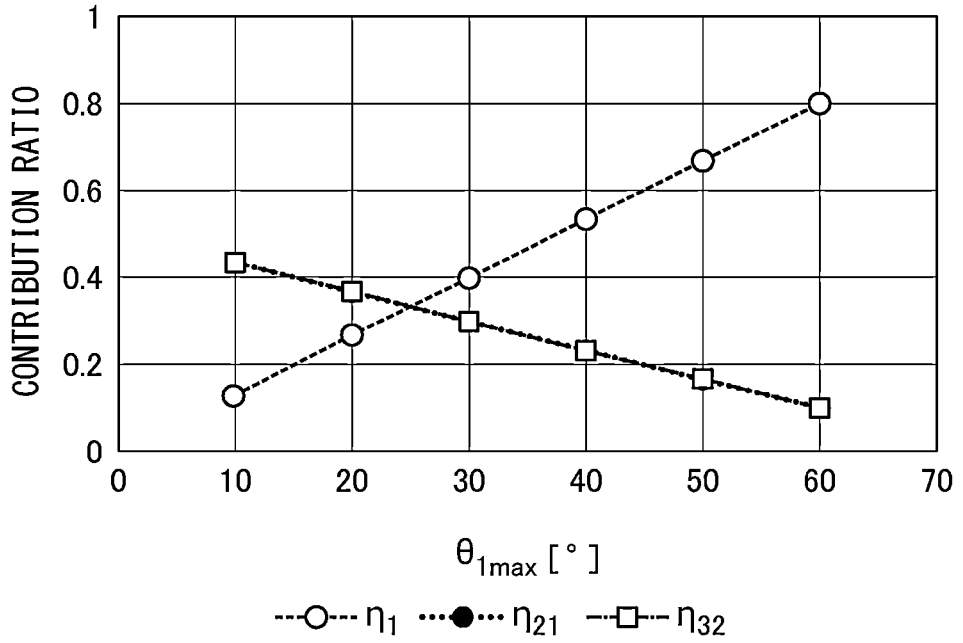
FIG. 13 is a diagram illustrating a change in contribution ratio when $\theta_{1\ max}$ changes at $\theta_{3\ max}$=75°.
Figure 14:
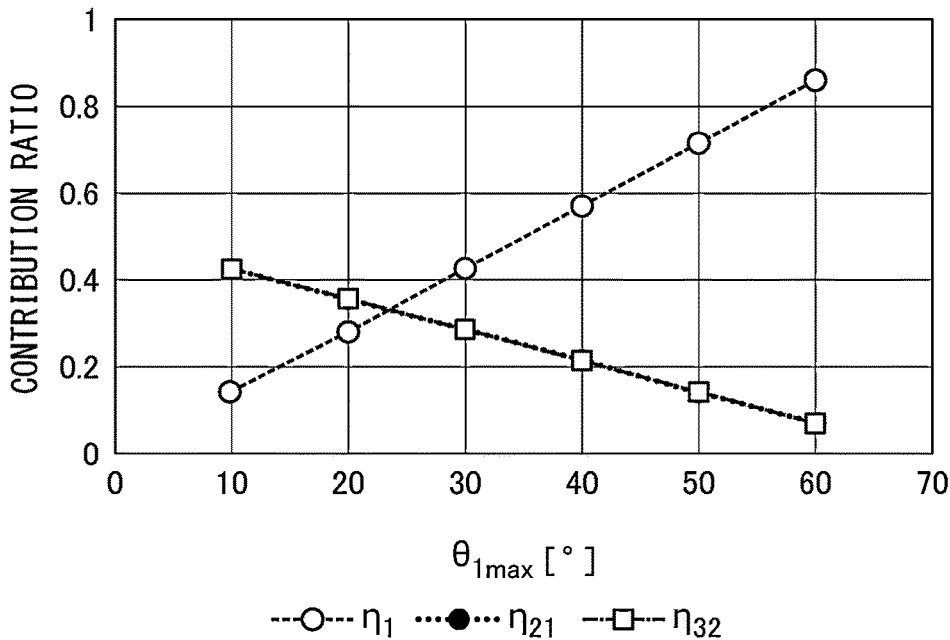
FIG. 14 is a diagram illustrating a change in contribution ratio when $\theta_{1\ max}$ changes at $\theta_{3\ max}$=70°.

FIGS. 10 to 14 illustrate results of calculating a combination of $\theta_{1\ max}$, $\theta_{2max}$, and $\theta_{3\ max}$ where the light radiation efficiency of the illumination device 10 is maximized. FIG. 10 illustrates a change in the contribution ratio when $\theta_{1\ max}$ changes at $\theta_{3\ max}=90°$. FIG. 11 illustrates a change in the contribution ratio when $\theta_{1\ max}$ changes at $\theta_{3\ max}=85°$. FIG. 12 illustrates a change in the contribution ratio when $\theta_{1\ max}$ changes at $\theta_{3\ max}=80°$. FIG. 13 illustrates a change in the contribution ratio when $\theta_{1\ max}$ changes at $\theta_{3\ max}=75°$. FIG. 14 illustrates a change in the contribution ratio when $\theta_{1\ max}$ changes at $\theta_{3\ max}=70°$. Note that, in FIGS. 13 and 14, graphs of $\eta_{21}$ and $\eta_{32}$ partially overlap and cannot be visually distinguished.

As can be seen from FIG. 10, when $\theta_{1\ max}$ increases at $\theta_{3\ max}=90°$, $\eta_{21}$ and $\eta_{32}$ are not matched. This is because the inclination angle of the first surface of the meniscus lens 16 exceeds 90°, and the condition of $\eta_{21}=\eta_{32}$ cannot be satisfied. Further, as can be seen from FIG. 11, when $\theta_{1\ max}$ increases at $\theta_{3\ max}=85°$, $\eta_{21}$ and $\eta_{32}$ are not matched, but a difference is smaller than that at $\theta_{3\ max}=90°$ in FIG. 10. Further, as can be seen from FIGS. 12 to 14, at $\theta_{3\ max}=80°$, 75°, and 70°, $\eta_{21}=\eta_{32}$ is obtained in almost the entire range of $\theta_{1\ max}$.

Figure 15:
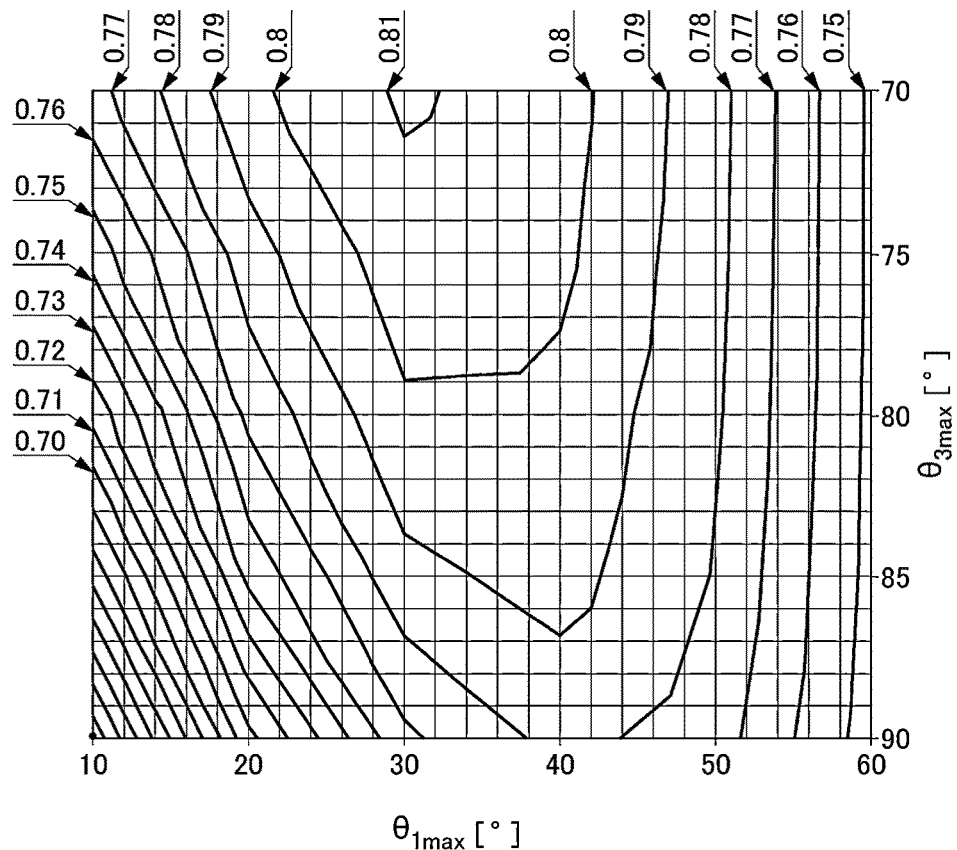
FIG. 15 is a diagram illustrating light radiation efficiency of the illumination device with contour lines under each condition in FIGS. 10 to 14.

FIG. 15 illustrates the light radiation efficiency of the illumination device 10 with contour lines under each condition of FIGS. 10 to 14. As can be seen from FIG. 15, as $\theta_{3\ max}$ increases, the light radiation efficiency decreases, and at the same time, $\theta_{1\ max}$ at which the light radiation efficiency is maximized increases. For example, when $\theta_{3\ max}$ is 90°, the light radiation efficiency is maximized (about 0.78) at $\theta_{1\ max}=40°$, and when $\theta_{3\ max}$ is 70°, the light radiation efficiency is maximized (about 0.81) at $\theta_{1\ max}$ around 30°.

The following can be known from FIG. 15.

(1) In the ranges of $\theta_{1\ max}=27°$ to 58° and $\theta_{3\ max}=70°$ to 90°, the light radiation efficiency is 0.75 or more.

(2) In the ranges of $\theta_{1\ max}=29°$ to 54° and $\theta_{3\ max}=70°$ to 90°, the light radiation efficiency is 0.76 or more.

(3) In the ranges of $\theta_{1\ max}=38°$ to 43° and $\theta_{3\ max}=70°$ to 90°, the light radiation efficiency is 0.78 or more.

(4) In the ranges of $\theta_{1\ max}=32°$ to 42° and $\theta_{3\ max}=74°$ to 84°, the light radiation efficiency is 0.79 or more.

15

16

(5) In the ranges of $\theta_{1\ max}=30°$ to 38° and $\theta_{3\ max}=70°$ to 78°, the light radiation efficiency is 0.80 or more.

On the other hand, as described above, when the light is spread to 140° or more ($70°\leq\theta_{3\ max}$), there is $\theta_2$ at which the light radiation efficiency is maximized, and optimum $\theta_2$ is determined by the above Formula (19) or (21).

In addition, with respect to the light distribution (also referred to as a radiation angle distribution of light intensity or simply a light intensity distribution) of the illumination device 10, in a range of $-70°\leq\theta_3\leq70°$ or a range of $-80°\leq\theta_3\leq80°$, a CV value (variation count; Coefficient of variation) is preferably 0.05 or less, more preferably 0.04 or less, and particularly preferably 0.035 or less.

Based on the content of the embodiment of the present invention described above, the light source 12, the diffusion element 14, and the lens group 16 were designed, and simulation was performed as to what light distribution characteristics can be obtained as the illumination device 10. For the simulation, OpticsStudio 5 Ver20.1 manufactured by Zemax was used.

As the light source 12, NIR-VCSEL (Part Number: V0081) manufactured by Vixar was used. This light source emits near-infrared light having a dominant wavelength of 940 nm. In addition, this light source has an array shape in which a plurality of light emitting areas are arranged in a hexagonal close-packed manner, and is an aggregate of a total of 281 VCSEL light emitters, and the size of the light emitter (light emitting surface) is about 1.0 mm×1.0 mm.

Figure 16:
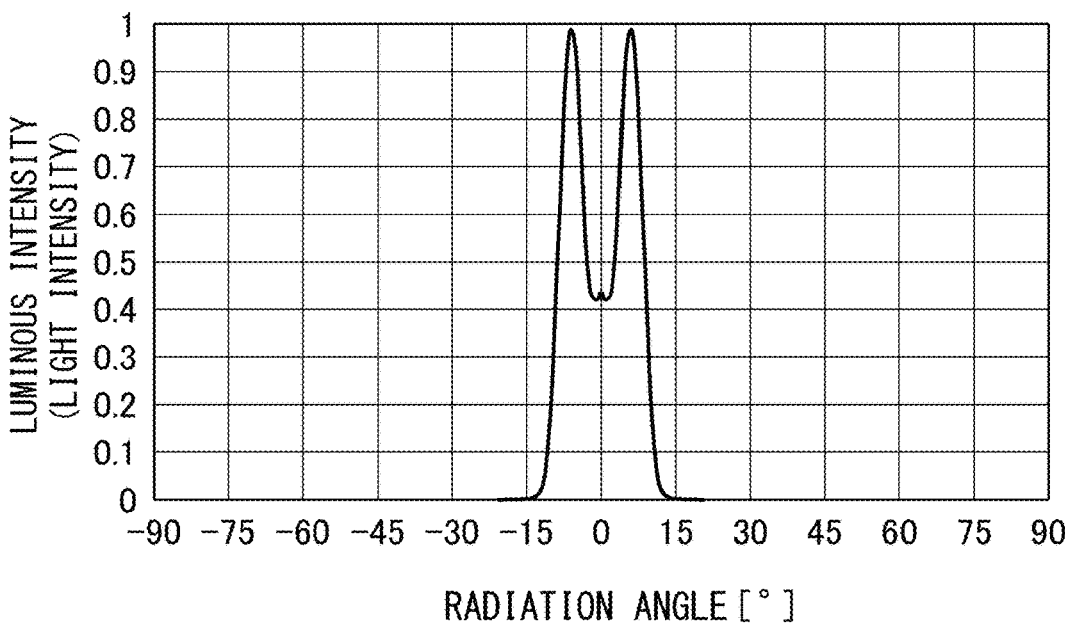
FIG. 16 is a diagram illustrating a light intensity distribution of light emitted from a light source used in a simulation.

FIG. 16 illustrates a light intensity distribution of light emitted from the light source used in the simulation. The light intensity distribution is substantially axisymmetric. In the light intensity distribution, the FWHM (full width at half maximum) is 18°, the light intensity near the optical axis (radiation angle=0°) is relatively small, a substantially toroidal distribution indicating the maximum light intensity distribution at a predetermined emission angle is shown.

Figure 17:
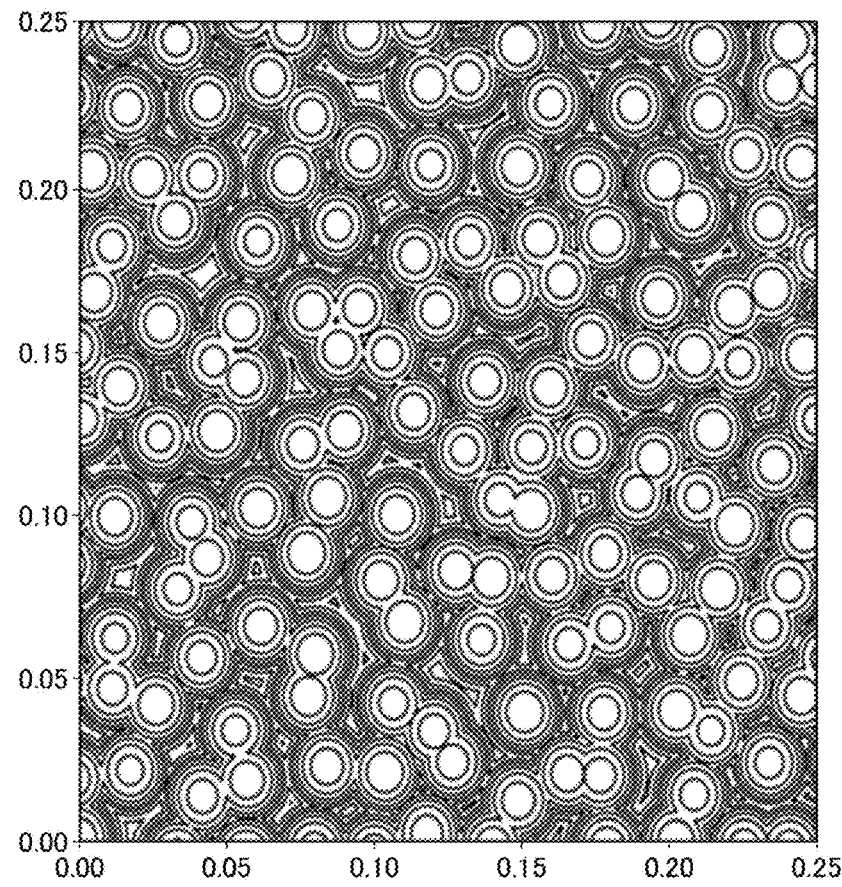
FIG. 17 is a plan view of a microlens array used in a simulation.
Figure 18:
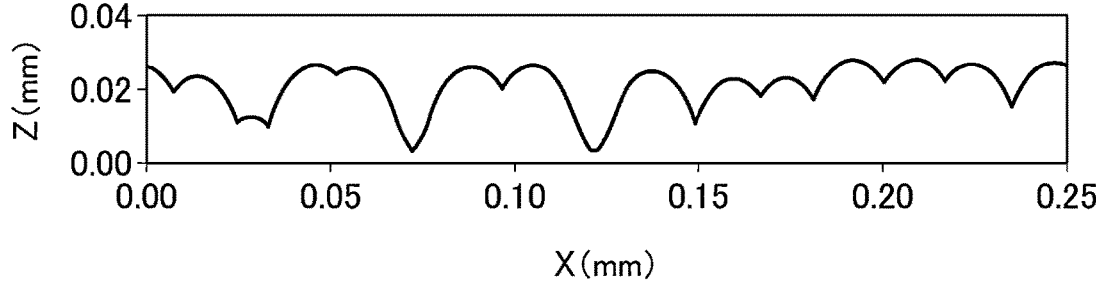
FIG. 18 is a partial cross-sectional view of the microlens array illustrated in FIG. 17.

As the diffusion element 14, a plate-shaped microlens array in which a plurality of microlenses are formed on one surface was used. FIG. 17 is a plan view of a range of 0.25 mm×0.25 mm of the microlens array used in the simulation. FIG. 18 is a partial cross-sectional view of the microlens array illustrated in FIG. 17.

The microlens array has a principal surface of 1 mm×1 mm and a plate shape with a thickness of 0.4 mm, and a plurality of convex microlenses are formed on one side of the principal surface. The microlens array has an average arrangement pitch of about 24 μm, and is formed randomly. The microlens is an axisymmetric convex surface, and a basic shape thereof is represented by the following Formula (24).

$$Z = \frac{C \times r^2}{1 + \sqrt{1 - (1+K) \times C^2 \times r^2}} + a_2 \times r^2 + a_4 \times r^4 + a_6 \times r^6 \quad (24)$$

Here, C=0.010133, K=−0.7, $a_2$=28.95186, $a_4$=123969.3, and $a_6$=0 are satisfied, r is the distance [mm] from the symmetry axis, and Z represents the Sag amount [mm].

Further, each microlens was formed so as to randomly have a variation of ±9 μm in a direction parallel to the principal surface and ±1 μm in a direction perpendicular to the principal surface.

In such a microlens array, for example, a mold in which the unevenness of the lens shape of the microlens array is reversed was prepared, and cast on one surface of a 2 mm×2 mm×t 0.4 mm (t is a thickness) parallel flat plate-shaped transparent substrate using a resin. As the resin, for example, a predetermined shape can be formed using a photocurable resin (Celloxide 2021P (main component: 3', 4'-epoxycyclohexylmethyl 3,4-epoxycyclohexanecarboxylate) manufactured by Daicel Corporation).

Figure 19:
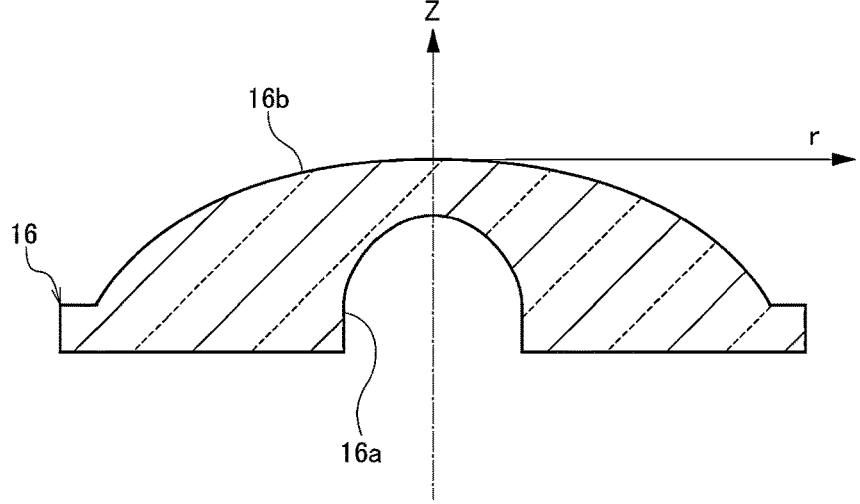
FIG. 19 is a schematic cross-sectional view of a meniscus lens used in a simulation.

As the lens group 16, a meniscus lens was used. FIG. 19 is a schematic cross-sectional view of the meniscus lens 16 used in the simulation. As an axisymmetric lens, the meniscus lens 16 obtained a data group of (r, Z) of the first surface (light incidence surface) 16a and the second surface (light emission surface) 16b according to the above-described lens surface design procedure including calculation based on $\theta_1$, $\theta_2$, and $\theta_3$, where r is a distance from an axis and Z is a Sag amount. The following Table 1 shows data of (r, Z) of the first surface 16a and the second surface 16b of the meniscus lens 16.

TABLE 1

| First surface | | Second surface | |
|---|---|---|---|
| r [mm] | Z [mm] | r [mm] | Z [mm] |
| 0 | −1 | 0 | 0 |
| 0.08722 | −1.00239 | 0.12954 | −0.00052 |
| 0.17415 | −1.00956 | 0.25963 | −0.00206 |
| 0.26050 | −1.02153 | 0.39061 | −0.00456 |
| 0.34597 | −1.03829 | 0.52282 | −0.00804 |
| 0.43027 | −1.05981 | 0.65663 | −0.01255 |
| 0.51311 | −1.08601 | 0.79241 | −0.01818 |
| 0.59420 | −1.11681 | 0.93051 | −0.02511 |
| 0.67326 | −1.15207 | 1.07130 | −0.03353 |
| 0.75002 | −1.19167 | 1.21509 | −0.04370 |
| 0.82424 | −1.23542 | 1.36220 | −0.05593 |
| 0.89567 | −1.28313 | 1.51289 | −0.07057 |
| 0.96410 | −1.33459 | 1.66737 | −0.08802 |
| 1.02934 | −1.38955 | 1.82580 | −0.10870 |
| 1.09120 | −1.44776 | 1.98830 | −0.13305 |
| 1.14953 | −1.50895 | 2.15487 | −0.16157 |
| 1.20423 | −1.57283 | 2.32546 | −0.19473 |
| 1.25520 | −1.63909 | 2.49992 | −0.23302 |
| 1.30237 | −1.70744 | 2.67799 | −0.27690 |
| 1.34572 | −1.77755 | 2.85933 | −0.32681 |
| 1.36597 | −1.81317 | 2.95108 | −0.35414 |
| 1.38526 | −1.84911 | 3.04345 | −0.38313 |
| 1.42102 | −1.92179 | 3.22976 | −0.44618 |
| 1.45309 | −1.99528 | 3.41753 | −0.51619 |
| 1.48157 | −2.06926 | 3.60589 | −0.59329 |
| 1.50661 | −2.14344 | 3.79420 | −0.67760 |
| 1.52837 | −2.21754 | 3.98160 | −0.76911 |
| 1.54708 | −2.29129 | 4.16514 | −0.86663 |
| 1.56307 | −2.36436 | 4.34340 | −0.96962 |
| 1.57665 | −2.43654 | 4.51579 | −1.07784 |
| 1.58813 | −2.50763 | 4.68158 | −1.19092 |
| 1.59780 | −2.57751 | 4.83997 | −1.30839 |
| 1.60594 | −2.64611 | 4.99010 | −1.42968 |
| 1.61283 | −2.71337 | 5.13167 | −1.55467 |
| 1.61863 | −2.77934 | 5.26595 | −1.68466 |
| 1.62347 | −2.84408 | 5.39295 | −1.81995 |
| 1.62742 | −2.90767 | 5.51248 | −1.96067 |
| 1.63053 | −2.97021 | 5.62394 | −2.10651 |
| 1.63287 | −3.03178 | 5.72677 | −2.25712 |
| 1.63449 | −3.09248 | 5.82039 | −2.41208 |
| 1.63543 | −3.15238 | 5.90427 | −2.57097 |
| 1.63573 | −3.21158 | 5.97792 | −2.73328 |

The actual meniscus lens 16 was manufactured by cutting polycarbonate (Model No. PCET1600 manufactured by Takiron Corporation). The Sag amount (Z value) with respect to the distance r from the optical axis (Z axis) was obtained by the method described in the above-described embodiment, and numerical data was input to a machining device to perform machining.

Figure 20:
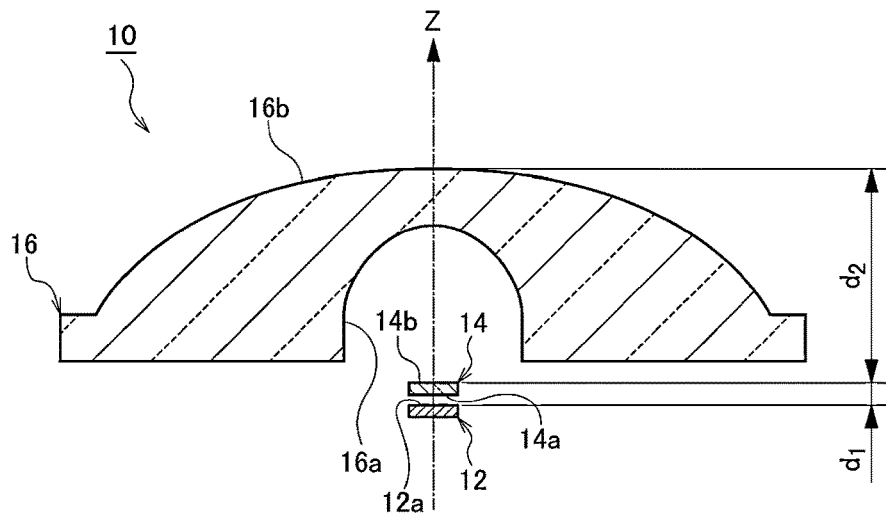
FIG. 20 is a diagram illustrating a configuration of an illumination device for which a simulation has been performed.

FIG. 20 illustrates a configuration of the illumination device 10 for which a simulation has been performed. The light source 12, the diffusion element (microlens array) 14, and the lens group (meniscus lens) 16 described above are disposed as illustrated in FIG. 20. An axis (Z axis) along which the light intensity distribution of the light source 12 is axisymmetric was defined as an optical axis of the light source 12.

In the diffusion element 14 in which a large number of microlenses are formed on one surface, a surface on which the microlenses are formed is defined as a first surface 14a, and a flat surface on the opposite side is defined as a second surface 14b. The diffusion element 14 was disposed such that the first surface 14a of the diffusion element 14 faces the light emission surface 12a of the light source 12, and such that the optical axis of the light source 12 is perpendicular to the second surface 14b of the diffusion element 14 and passes through the geometric center of the principal surface of the diffusion element 14. Further, the meniscus lens 16 was disposed such that the first surface 16a of the meniscus lens 16 faces the diffusion element 14 and the optical axis of the meniscus lens 16 is matched with the optical axis of the light source 12. The optical axis of the light source 12 was defined as the Z direction, and the direction in which light is emitted from the light source 12 was defined as positive.

Further, in the intervals of the components in the Z direction, the distance between the light emission surface 12a of the light source 12 and the second surface 14b of the diffusion element 14 was defined as $d_1$, and the distance between the second surface 14b of the diffusion element 14 and the second surface 16b of the meniscus lens 16 was defined as $d_2$. By changing $d_1$ in a range of 0.2 mm to 1.5 mm and $d_2$ in a range of 1.5 mm to 5.0 mm, fine adjustments were made so that $\theta_{3\ max}$ is large and the variation in light distribution (CV value) is small. As one suitable value, $d_1$ is about 0.7 mm, and $d_2$ is about 3.5 mm.

In the simulation, first, $1 \times 10^6$ light beams were emitted from the light emission surface 12a of the light source 12 with the light distribution (light intensity distribution) illustrated in FIG. 16, and the light distribution (light intensity distribution) of the light emitted from the diffusion element 14 was obtained. Next, in the size and arrangement of the diffusion element 14, $5 \times 10^7$ light beams were emitted with the light distribution of the light emitted from the diffusion element 14, and light traces of the light incident on the lens group (meniscus lens) 16 and the light emitted from the lens group 16 were obtained to obtain a light intensity distribution of the illumination device 10.

Figure 21:
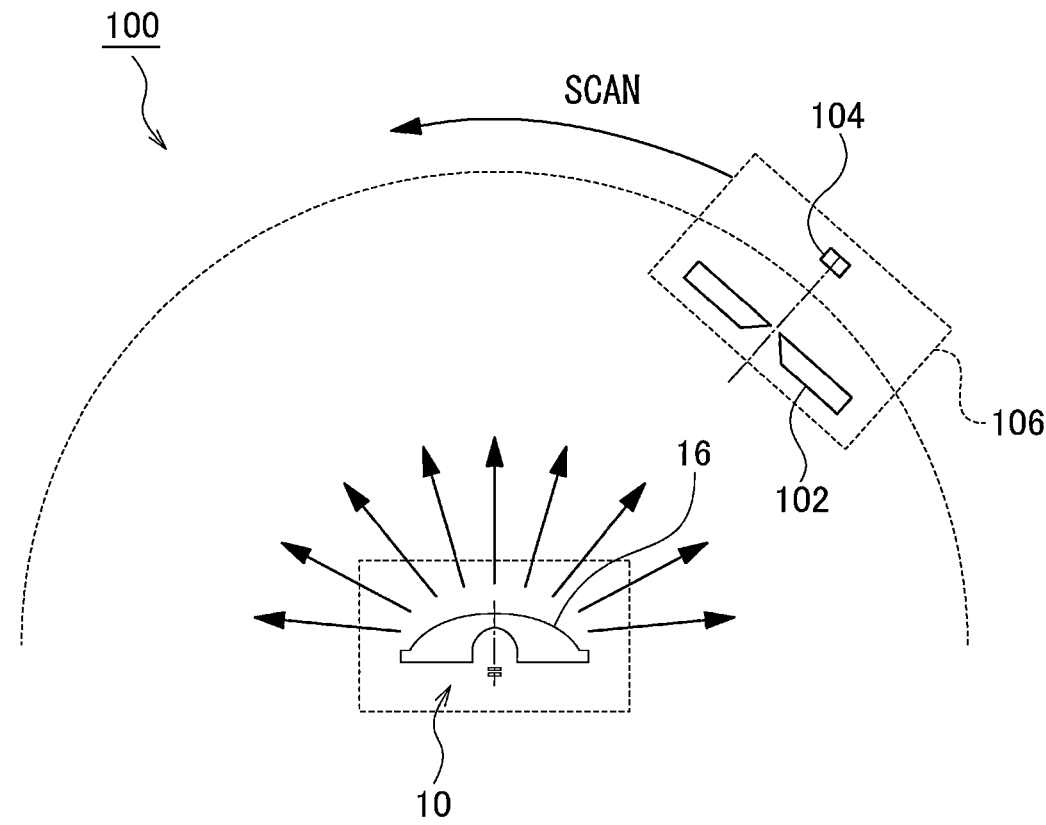
FIG. 21 is a diagram illustrating a measurement system for measuring a light distribution of the illumination device.

Furthermore, the light source 12, the diffusion element 14, and the meniscus lens 16 were prepared, and an actual illumination device 10 was manufactured. FIG. 21 illustrates a measurement system 100 for measuring the light distribution of the illumination device 10. The measurement system 100 includes a photodetector 106 including a diaphragm 102 and a photoelectric element 104. The illumination device 10 is fixed and caused to emit light, and the photodetector 106 scans the periphery of the illumination device 10 around the principal point of the lens group 16 such as the meniscus lens, for example, so that the dependency of the angle $\theta_3$ of the light intensity can be measured.

Figure 22:
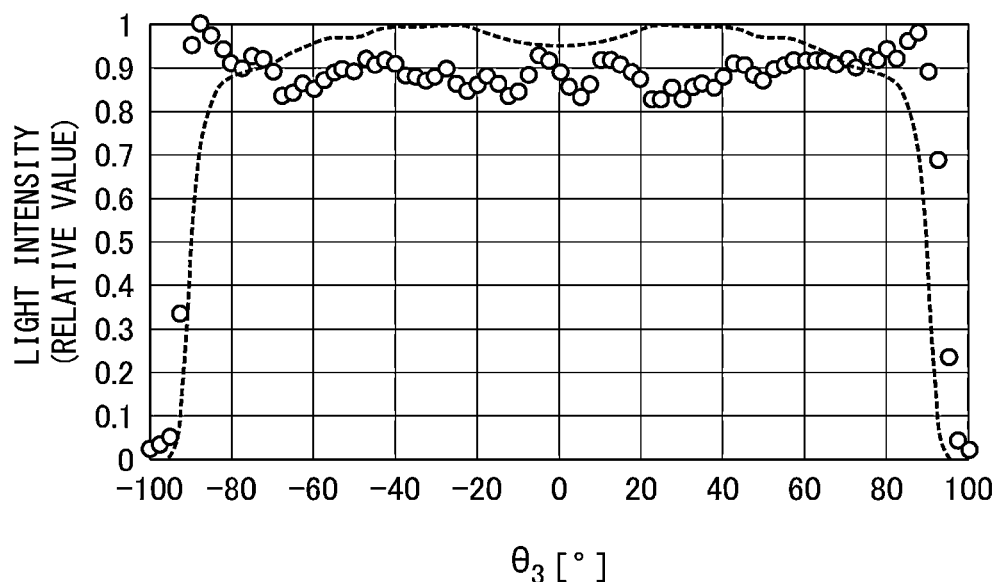
FIG. 22 is a diagram illustrating a light intensity distribution of the illumination device obtained by a simulation and an actually measured light intensity distribution of the illumination device.

FIG. 22 illustrates a light intensity distribution of the illumination device obtained by the simulation and an actually measured light intensity distribution of the illumination device. The light intensity distribution of the illumination device obtained by the simulation is indicated by a broken line. The actually measured light intensity distribution (actually measured value) of the illumination device is indicated by a circle.

Although the actually measured value is slightly different from the simulation, $\theta_{3\ max\ is}$ 94° (an angle corresponding to the light intensity of 0.5 (an angle corresponding to a half value)), and the illumination device provides a uniform light distribution over a wider angle as compared with the technology described in the above Patent Document 1, for example.

The CV value (coefficient of variation) representing the variation in light distribution was 0.0228 (simulation) and 0.0329 (actually measured value) in a range of $-70° \leq \theta_3 \leq 70°$, and 0.0344 (simulation) and 0.0339 (actually measured value) in a range of $-80° \leq \theta_3 \leq 80°$.

In the above description, the method and example of design capable of illuminating the inside of a region centered on the optical axis Ax by setting the value of $|\theta_3|$ to the angle from 0° to the maximum value $\theta_{3\ max}$ have been described. For the value of $|\theta_3|$, the shape of the meniscus lens 16 can also be designed so as to emit light in a range of, for example, 40° to 90° or 30° to 80°. For example, it is possible to realize an illumination device having a light distribution illustrated in FIG. 23. Such a light amount distribution may be referred to as a concave, toroidal, or ring-shaped light amount distribution. It may also be referred to as Bat-Wing because its contrasting shape is reminiscent of the shape of a bat with its wings open.

Figure 23:
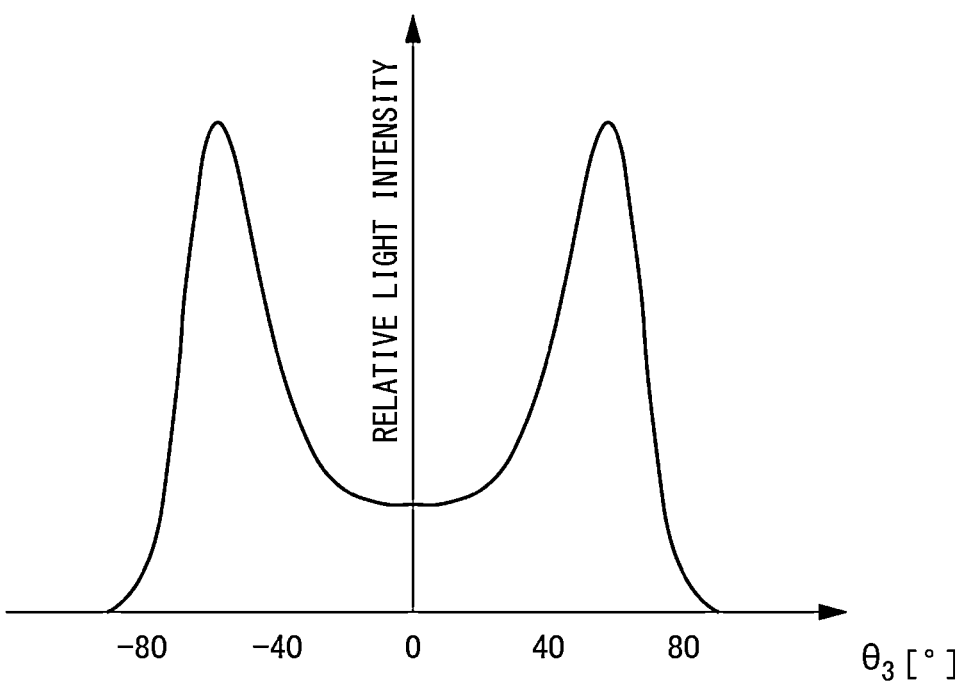
FIG. 23 is a diagram illustrating an example of a light distribution of the illumination device.
Figure 24:
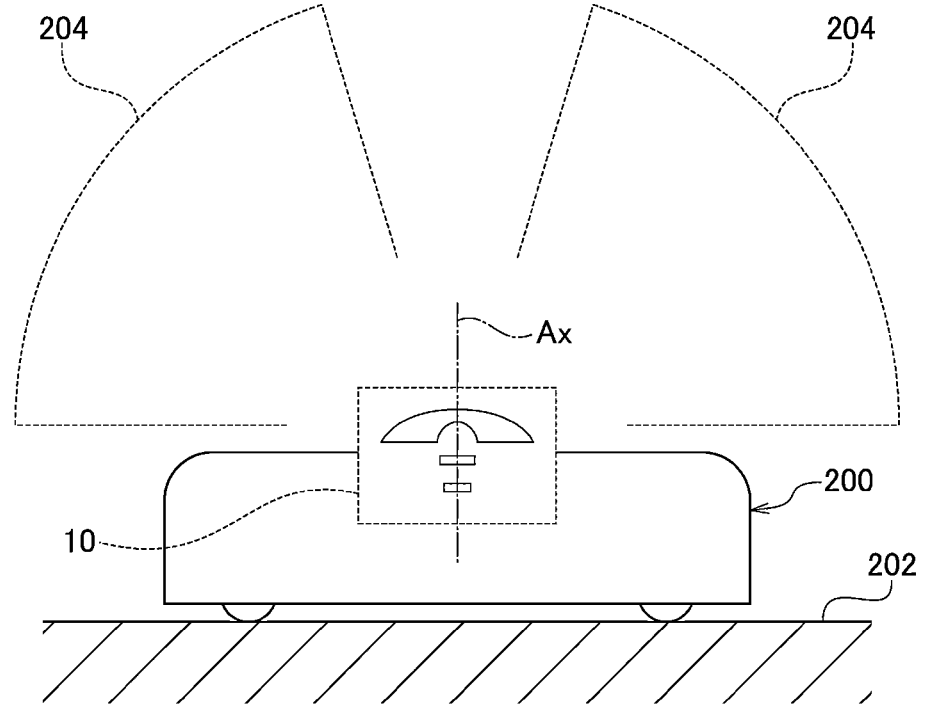
FIG. 24 is a diagram illustrating a traveling robot including an illumination device having the light distribution illustrated in FIG. 23.

FIG. 24 illustrates a traveling robot 200 including the illumination device having the light distribution illustrated in FIG. 23. The traveling robot 200 is, for example, an automatic cleaning robot, and the illumination device 10 is mounted such that the optical axis Ax is in a direction perpendicular to a traveling surface 202.

In the environment recognition of the traveling robot 200, there is a case where sensing of the vicinity of the traveling surface 202 is naturally required, but sensing of an upper space is not required. In such a case, the illumination device 10 has a light distribution in which light for illumination is not emitted in the vicinity of the optical axis Ax as illustrated in FIG. 23, so that the amount of light to an illumination region 204 on the side of the optical axis Ax can be increased, thereby improving the utilization efficiency of light.

As described above, an illumination device that does not emit light or has a small amount of light may be required in the vicinity of the optical axis Ax. At this time, by specifying the conditions of the microlens array constituting the diffusion element 14, it is possible to contribute to characteristics required for such an illumination device.

Figure 25:
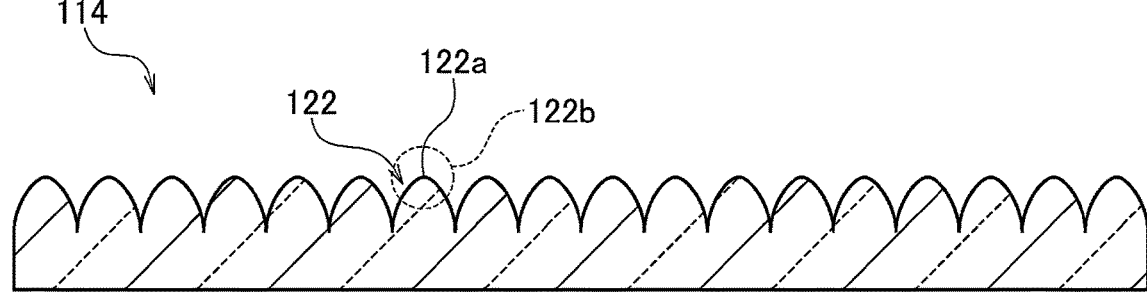
FIG. 25 is a diagram illustrating an example of a cross section of a part of the microlens array.

FIG. 25 illustrates an example of a cross section of a part of the microlens array 114. A highest point of the microlens 122 is defined as an apex 122a, and a portion including the apex 122a and near the apex is defined as an apex portion 122b. Although FIG. 25 illustrates the convex microlens 122, the same applies to the concave microlens, and at this time, a lowest point of the microlens may be defined as an apex.

When light from the light source is incident on the diffusion element including the microlens array 114 having the shape illustrated in FIG. 25, it is possible to obtain a toroidal light amount distribution in which the light amount in the vicinity of the optical axis of the light source is relatively small.

Figure 26:
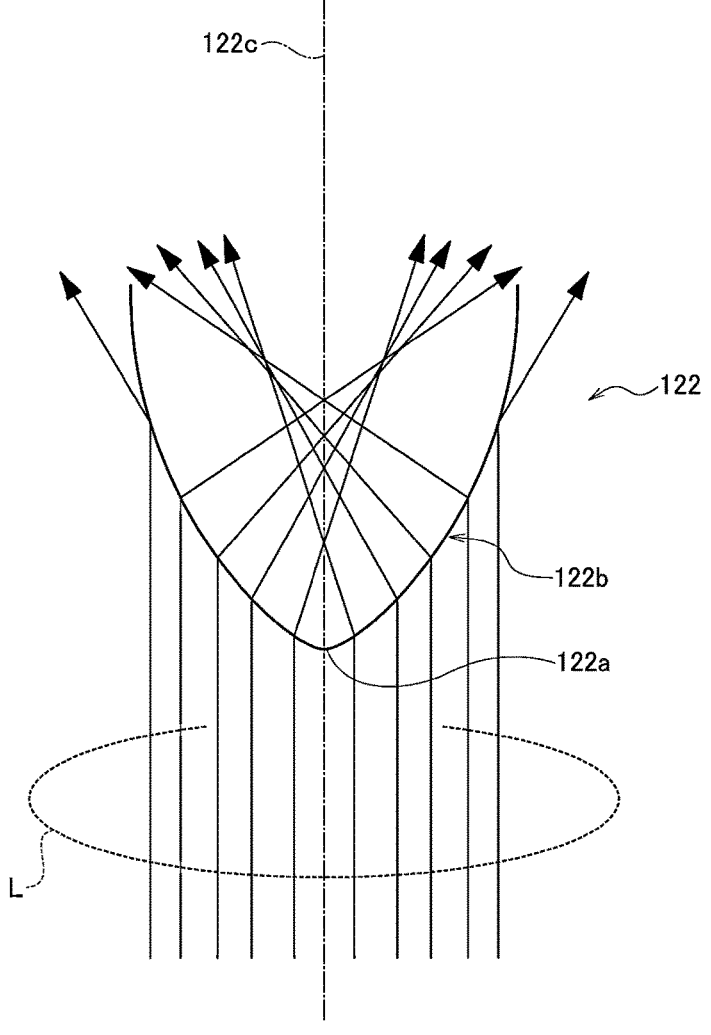
FIG. 26 is a schematic enlarged view of the microlens illustrated in FIG. 25.

FIG. 26 is a schematic enlarged view of the microlens 122 illustrated in FIG. 25. A straight line passing through the apex 122a of the microlens 122 is defined as an optical axis 122c of the microlens. The apex portion 122b of the microlens 122 is sharp, and the inclination from the apex 122a to both sides of the microlens 122 is steep at the apex portion 122b. A light beam L incident substantially parallel to the microlens 122 has a large deflection angle due to its steep inclination, and as a result, the light beam in the vicinity of the optical axis 122c decreases, and the light amount decreases. In a case where the apex portion 122b of the microlens 122 is not sharp (including a case where the apex portion partially has a surface close to flat (a surface perpendicular to the optical axis 122c)), a part of the light incident on the microlens 122 is emitted without being greatly deflected, and the degree of reduction in the light amount in the vicinity of the optical axis 122c decreases.

As the cross-sectional shape of such a specific microlens 122, it is sufficient that the inclination of the surface changes sharply at the apex 122a, and when the surface is represented by a function of the distance r from the optical axis 122c and the Sag amount Z, a second differential coefficient for r at the apex 122a may be discontinuous. FIGS. 27($a$) to 27($g$) illustrate examples of the cross-sectional shape of the microlens 122. These shapes may be called as follows according to a shape of a cross section of an edged tool such as a knife. FIG. 27($a$) illustrates a convex microlens 122. FIG. 27($b$) illustrates a flat microlens 122. FIG. 27($c$) illustrates a hollow microlens 122. FIG. 27($d$) illustrates a microlens 122 having a symmetrical shape including a convex shape and a flat shape. FIG. 27($e$) illustrates a microlens 122 having an asymmetrical shape including a convex shape and a flat shape. FIG. 27($f$) illustrates a microlens 122 having an asymmetrical shape including several flat shapes. FIG. 27($g$) illustrates a microlens 122 having a symmetrical shape including several flat shapes.

Next, a case where, in the illumination device 10, the intensity $F_3(\theta_3)$ of light per unit solid angle emitted from the illumination device 10 increases in a certain range with an increase in $|\theta_3|$ will be specifically considered. $|\theta_3|$ represents an absolute value of $\theta_3$. It is assumed that each symbol represents a parameter or physical quantity similar to or corresponding to that in the above unless otherwise specified.

The function in which $F_3(\theta_3)$ increases with an increase in $|\theta_3|$ is not limited thereto, and Formula (3A), Formula (3B), or generalized Formula (3C) can be exemplified. The reason why the case where the light intensity increases with the increase in $|\theta_3|$ is exemplified is that such a light intensity distribution is often required in order to improve the performance of the sensor, and for example, other function in which the light intensity decreases with the increase in $|\theta_3|$ can be designed, and the shape of the meniscus lens can be designed such that the light is emitted only in a predetermined angle range.

The reason why Formula (3C) or the like is exemplified as a representation of $F_3(\theta_3)$ is that, since there is a circumstance that a radiation aspect from the light source (including a radiation aspect of the light source defined by the simulation or the like) is a function including a cosine function cos θ of the radiation angle θ, or an aspect of the illuminance decreasing with an increase in distance from the optical axis is proportional to $\cos^4\theta$ (cosine fourth law), there is affinity to use a function formula including a cosine function of θ to represent a relation between the radiation angle and the changing light intensity.

In a case of finding an illumination device for a specific application, $F_3(\theta_3)$ is often directed to increase in a constant range as the radiation angle $\theta_3$ increases. In addition, the light intensity may be designated (discretely) by a discrete value corresponding to the radiation angle $\theta_3$. Even in such a case, discrete (scattered) data may be fitted by a continuous function $\{\cos(\alpha\times\theta_3)\}^{-n}$ (n and α are positive real numbers).

Further, in the illumination device 10, the intensity $F_3(\theta_3)$ of light per unit solid angle emitted from the illumination device 10 may be $\{\cos(\alpha\times\theta_3)\}^{-n}\leq F_3(\theta_3)\leq\{\cos(\beta\times\theta_3)\}^{-m}$ and $\{\cos(\alpha\times\theta_3)\}^{-n}<\{\cos(\beta\times\theta_3)\}^{-m}$ at $-80°\leq\theta_3\leq80°$. n and m are positive real numbers, and α and β are positive real numbers. Further, when $\{\cos(\alpha\times\theta_3)\}^{-n}\leq F_3(\theta_3)\leq\{\cos(\beta\times\theta_3)\}^{-m}$ and $\{\cos(\alpha\times\theta_3)\}^{-n}<\{\cos(\beta\times\theta_3)\}^{-m}$ are satisfied, $1\leq n$, $m\leq5$, $0.1\leq\alpha$, and $\beta\leq2.5$ may be satisfied. Alternatively, $\{\cos(\alpha\times\theta_3)\}^{-n}\leq F_3(\theta_3)\leq\{\cos(\beta\times\theta_3)\}^{-m}$ and $\{\cos(\alpha\times\theta_3)\}^{-n}<\{\cos(\beta\times\theta_3)\}^{-m}$ may be satisfied at $-85°\leq\theta_3\leq85°$. n and m are positive real numbers, and α and β are positive real numbers. Further, when $\{\cos(\alpha\times\theta_3)\}^{-n}\leq F_3(\theta_3)\leq\{\cos(\beta\times\theta_3)\}^{-m}$ and $\{\cos(\alpha\times\theta_3)\}^{-n}<\{\cos(\beta\times\theta_3)\}^{-m}$ are satisfied, $1\leq n$, $m\leq5$, $0.1\leq\alpha$, and $\beta\leq2.5$ may be satisfied. Note that the above function may be normalized such that the light intensity $F_3(0)=1$ is satisfied at $\theta_3=0$, or such that the minimum value of $F_3(\theta_3)$ in the specific range of $\theta_3$ is equal to 1. The illumination devices flowing in the market may also be compared and controlled by measuring the light intensity by the method illustrated in FIG. 22 and normalizing the light intensity $F_3(0)=0$ at $\theta_3=0$ or the minimum value of $F_3(\theta_3)$ in the specific range of $\theta_3$ as 1 (the same applies hereinafter).

Furthermore, in the illumination device 10, the intensity $F_3(\theta_3)$ of light per unit solid angle emitted from the illumination device 10 may be $(\cos\theta_3)^{-0.1}\leq F_3(\theta_3)\leq(\cos\theta_3)^{-1.2}$ in $\alpha=\beta=1$ at $-80°\leq\theta_3\leq80°$. Alternatively, preferably, $(\cos\theta_3)^{-0.2}\leq F_3(\theta_3)\leq(\cos\theta_3)^{-1}$ may be satisfied. At $-80°\leq\theta_3\leq80°$, in $\alpha=\beta=1$, $(\cos\theta_3)^{-0.1}\leq F_3(\theta_3)\leq(\cos\theta_3)^{-1.2}$ may be satisfied. Alternatively, preferably, $(\cos\theta_3)^{-}0.2\leq F_3(\theta_3)\leq(\cos\theta_3)^{-1}$ may be satisfied.

In particular, as an application for a portable illumination device used for a portable computer such as a smartphone or a terminal, in the illumination device 10, the intensity $F_3(\theta_3)$ of light per unit solid angle emitted from the illumination device 10 may be $\{\cos(\alpha\times\theta_3)\}^{-0.1}\leq F_3(\theta_3)\leq\{\cos(\beta\times\theta_3)\}^{-7}$ ($0<\alpha$ and $\beta<1$) at $-80°\leq\theta_3\leq80°$, and α and β may be determined so that $F_3(\theta_3)$ does not rapidly increase in an angle range where $\theta_3$ is 70° to 90°. α and β may be determined to be numerical values in a range of $F_3(\theta^0_3)=1$ to 10 (not including 1) at an angle $\theta^0_3$ (for example, $\theta^0_3=70°$, 80°, 90° may be satisfied) in an angle range where $\theta_3$ is 70° to 90°. α and β may be preferably determined to be numerical values in a range of $F_3(\theta^0_3)=1.1$ to 10. In addition, at $-80°\leq\theta_3\leq80°$, $\{\cos(0.9\times\theta_3)\}^{-0.1}\leq F_3(\theta_3)\leq\{\cos(0.415\times\theta_3)\}^{-10}$ may be satisfied, and $\{\cos(0.4\times\theta_3)\}^{-1.5}\leq F_3(\theta_3)\leq\{\cos(0.465\times\theta_3)\}^{-7.5}$ may be satisfied. In the case of use in the above applications, a ratio of the light intensity in the center portion to the light intensity in the peripheral portion on the surface irradiated by the illumination device is preferably about 1:10 to 1:5. In addition, as described above, the light distribution including the cosine function is often used.

Figure 29:
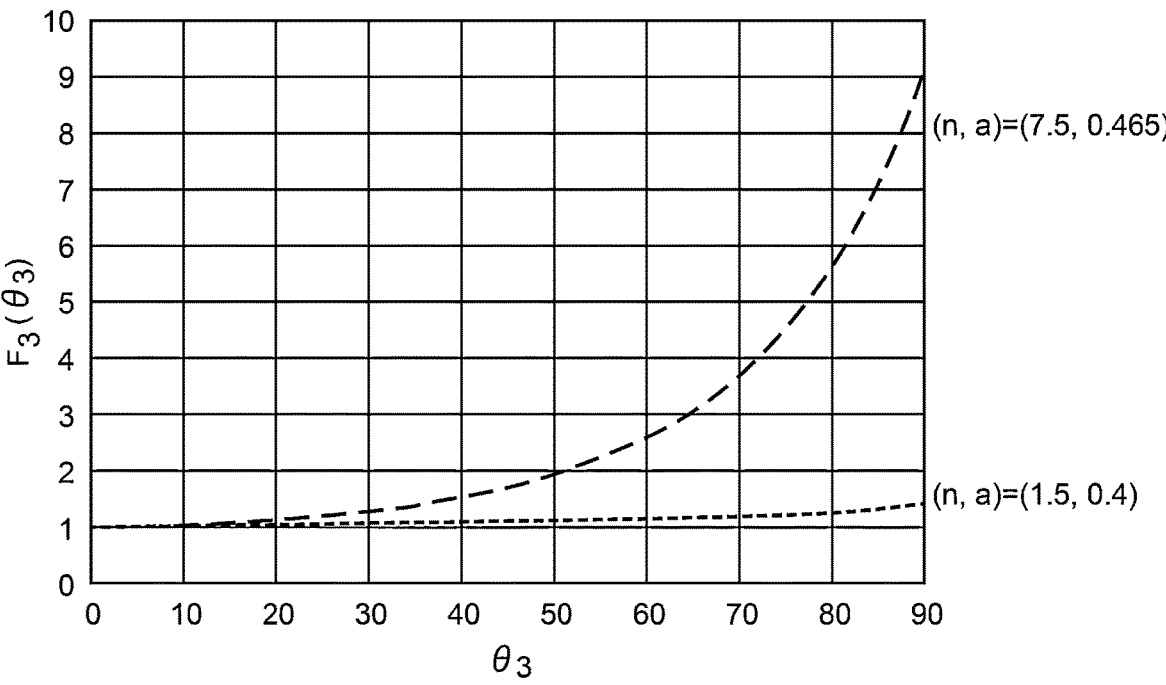
FIG. 29 is a diagram illustrating a graph representing functions of $F_3(\theta_3)=\{\cos(0.4\times\theta_3)\}^{-1.5}$ and $F_3(\theta_3)=\{\cos(0.465\times\theta_3)\}^{-7.5}$, and a graph of some functions included between the functions.

FIG. 28 illustrates graphs representing functions of $F_3(\theta_3)=\{\cos(0.9\times\theta_3)\}^{-0.1}$ and $F_3(\theta_3)=\{\cos(0.415\times\theta_3)\}^{-10}$ at $0<\theta_3$ (note that only a region of $0<\theta_3$ is displayed because it is symmetric with respect to=0), and graphs of some functions included between these functions. FIG. 29 illustrates a graph representing functions of $F_3(\theta_3)=\{\cos(0.4\times\theta_3)\}^{-1.5}$ and $F_3(\theta_3)=\{\cos(0.465\times\theta_3)\}^{-7.5}$, and a graph of some functions included between these functions.

As an example, $F_3(\theta_3)=(\cos\theta_3)^{-3}$ will be described. $F_3(\theta_3)$ is represented by Formula (10) or Formula (13) described above. When $F_3(\theta_3)=(\cos\theta_3)^{-3}$ is satisfied, Formula (13) is applied as Formula (25).

$$(\cos\theta_3)^{-3}=F_1(\theta_1)\cdot\Delta\theta_1\cdot\sin\theta_1/(\Delta\theta_3\cdot\sin\theta_3) \qquad (25)$$

Furthermore, when $F_1(\theta_1)$ is constant regardless of $\theta_1$, the following Formula obtained from Formula (25).

$$(\Delta\theta_3 \cdot \sin\theta_3)(\cos\theta_3)^{-3} C \cdot \Delta\theta_1 \cdot \sin\theta_1 \tag{26}$$

Here, C is a constant.

Although there is a difference that the term of $(\cos\theta_3)^{-3}$ is multiplied on the left side when Formula (26) and Formula (14) are compared, $\theta_3$ corresponding to $\theta_1$ can be sequentially obtained by the similar method described in paragraph 0068. Note that $(\cos\theta_3)^{-3}$ is infinite at $\theta_3=90°$. When it is desired to cause the divergence angle to be larger than 180°, a function that is close to the target light intensity distribution and does not diverge even at $\theta_3=90°$ is selected as $F_3(\theta_3)$. For example, a function such as $$F_3(\theta_3)=\{\cos(\alpha\times\theta_3)\}^{-3} \tag{27}$$

is selected. However, $\alpha$ is a positive real number of 1 or less.

From the above, $\theta_1$ and $\theta_3$ corresponding to $\theta_1$ are obtained. However, similarly to when $F_3(\theta_3)$ is constant, since $\theta_2$ has arbitrariness, it is necessary to optimize this. The optimum $\theta_2$ can be obtained similarly to when $F_3(\theta_3)$ is constant.

Figure 30:
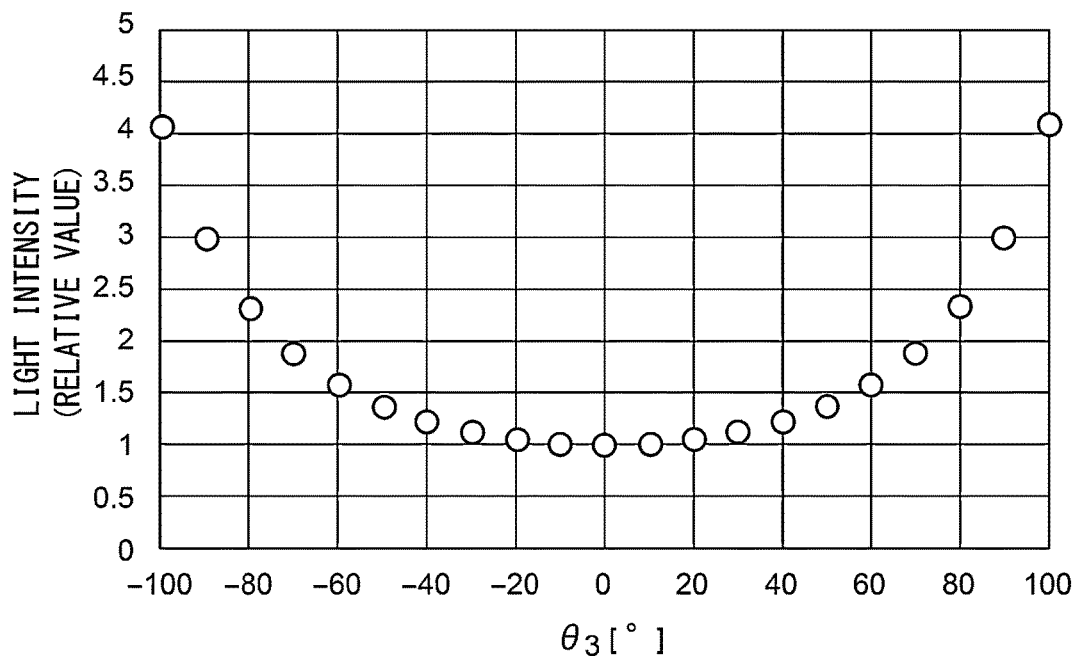
FIG. 30 is a diagram illustrating a light intensity distribution represented by $F_3(\theta_3)=\{\cos(0.512\times\theta_3)\}^{-3}$.

FIG. 30 illustrates a light intensity distribution represented by Formula (28).

$$F_3(\theta_3)=\{\cos(0.512\times\theta_3)\}^{-3} \tag{28}$$

Note that a value of a was determined so as to be F(90)=3 at $\theta_3=90°$.

Figure 31:
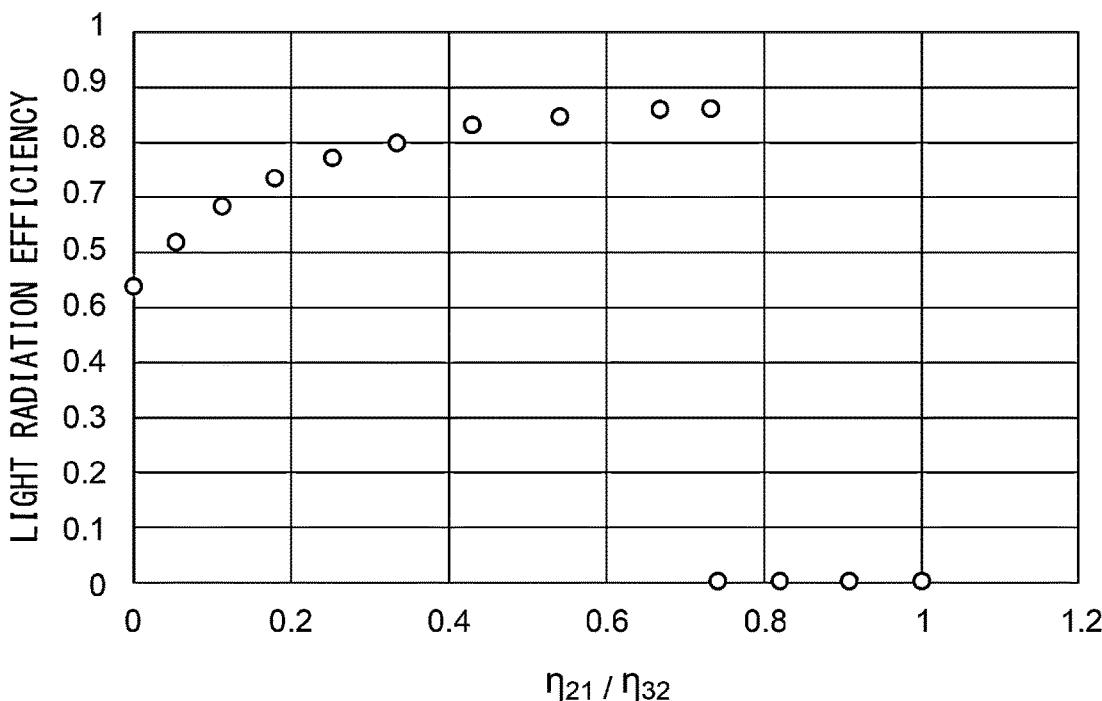
FIG. 31 is a diagram illustrating another example of a calculation result of light radiation efficiency of the illumination device.

FIG. 31 illustrates another example of the calculation result of the light radiation efficiency of the illumination device 10. In FIG. 31, a vertical axis of the graph represents light radiation efficiency, and a horizontal axis of the graph represents $\eta_{21}/\eta_{32}$. When $\theta_{1\ max}=40°$ and $\theta_{3\ max}=90°$ are satisfied, the light radiation efficiency was calculated for various $\eta_{21}$ and $\eta_{32}$. In this example, $\eta_1=40/90=0.44$ and $\eta_{21}+\eta_{32}=0.56$ are obtained.

From FIG. 31, it can be seen that the light radiation efficiency increases as $\eta_{21}/\eta_{32}$ increases, and the light radiation efficiency is maximized when $\eta_{21}/\eta_{32}$ is about 0.73. In this calculation example, the refractive index of the meniscus lens 16 is set to 1.586, and the light distribution of the radiation light is in accordance with Formula (28). In a case of $\eta_{21}/\eta_{32}>0.73$, the light radiation efficiency is 0, which means that the inclination angle of the first surface corresponding to the incidence surface of the meniscus lens is 90° or more, and it is difficult to manufacture the lens, so that it is in a range that cannot be realized.

Figure 32:
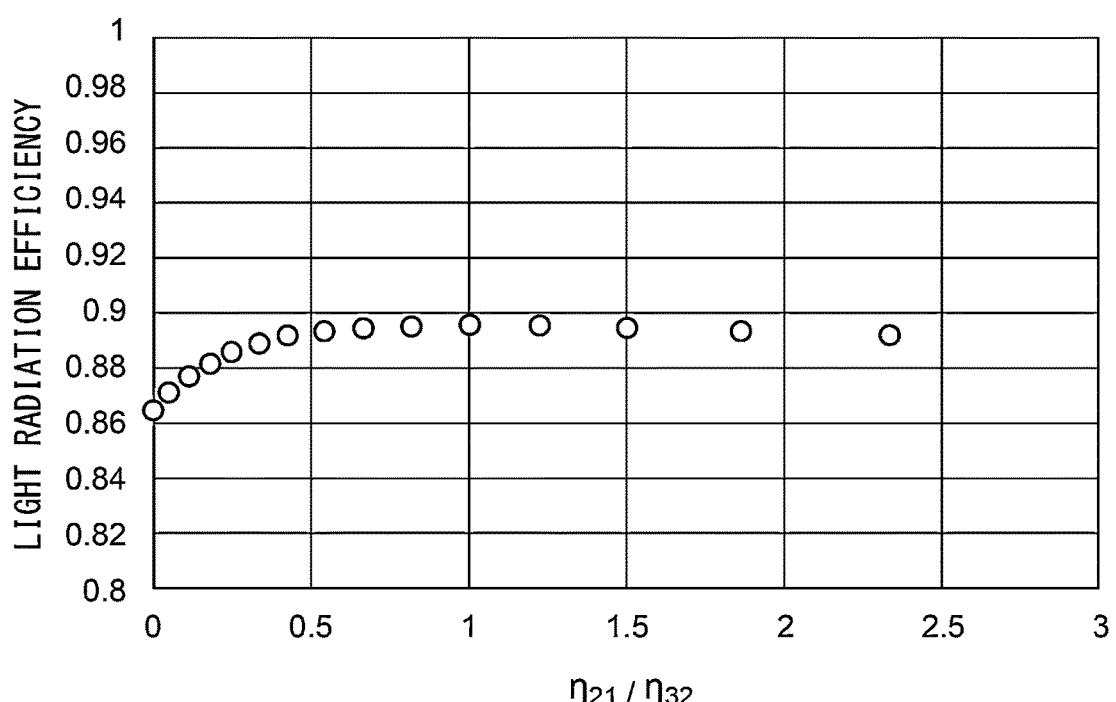
FIG. 32 is a diagram illustrating another example of a calculation result of light radiation efficiency of the illumination device.

FIG. 32 illustrates another example of the calculation result of the light radiation efficiency of the illumination device 10. Here, when $\theta_{1\ max}=40°$ and $\theta_{3\ max}=70°$ are satisfied, the light radiation efficiency was calculated for various $\eta_{21}$ and $\eta_{32}$. In this example, $\eta_1=40/70=0.57$ and $\eta_{21}+\eta_{32}=0.43$ are obtained.

In the example illustrated in FIG. 32, an angle to be deflected by the meniscus lens 16 is smaller than that in the example illustrated in FIG. 31. In the example illustrated in FIG. 31, it can be seen that as $\eta_{21}/\eta_{32}$ increases, the light radiation efficiency increases, takes a maximum value at $\eta_{21}/\eta_{32}=1$, and decreases again at the time of exceeding 1. Unlike the example illustrated in FIG. 29, under the condition of the example illustrated in FIG. 32, the maximum value of the light radiation efficiency is relatively small, but the inclination angle of the first surface 16a of the meniscus lens 16 does not exceed 90°, so that the meniscus lens 16 can be manufactured in a wide range of $\eta_{21}/\eta_{32}$.

Even in other combinations of $\theta_1$, $\theta_2$, and $\theta_3$, the light radiation efficiency of the illumination device 10 can be similarly calculated, and when conditions under which the light radiation efficiency is maximized are obtained for each combination, the following Formula (29) is satisfied.

$$\eta_{21} \leq \eta_{32} \tag{29}$$

However, an equal sign in Formula (29) is established when the inclination angle of the first surface 16a of the meniscus lens 16 is 90° or less, and represents that the light radiation efficiency increases when $\eta_{21}$ is increased as much as possible in a range in which the inclination angle of the first surface 16a of the meniscus lens 16 does not exceed 90°.

When Formula (29) is represented by an angle, the following Formula (30) or (31) is derived.

$$\Delta\theta_{21}/\theta_3 \leq \Delta\theta_{32}/\theta_3 \tag{30}$$

$$\text{Alternatively, } \theta_2-\theta_1 \leq \theta_3-\theta_2 \tag{31}$$

is the optimum condition.

From Formulas (30) and (31), it is possible to determine $\theta_2$ having the highest light radiation efficiency for different $\theta_1$ and $\theta_3$. For example, at $\theta_1=40°$ and $\theta_3=90°$, the light radiation efficiency of the illumination device 10 is maximized when $\eta_{21}/\eta_{32}=0.73$ is satisfied from FIG. 29. If $\theta_2$ is calculated from relations of the following Formulas (22) and (23):

$$\eta_{21}=\Delta\theta_{21}/\theta_3=(\theta_2-\theta_1)/\theta_3 \tag{22 and}$$

$$\eta_{32}=\Delta\theta_{32}/\theta_3=(\theta_3-\theta_2)/\theta_3 \tag{23},$$

$\theta_2=61.14°$ is obtained. Further, at $\theta_1=40°$ and $\theta_3=70°$, the light radiation efficiency of the illumination device 10 is maximized when $\eta_{21}/\eta_{32}=1$ is satisfied from FIG. 32, and if $\theta_2$ at this time is calculated, $\theta_2=55°$ is obtained.

Figure 33:
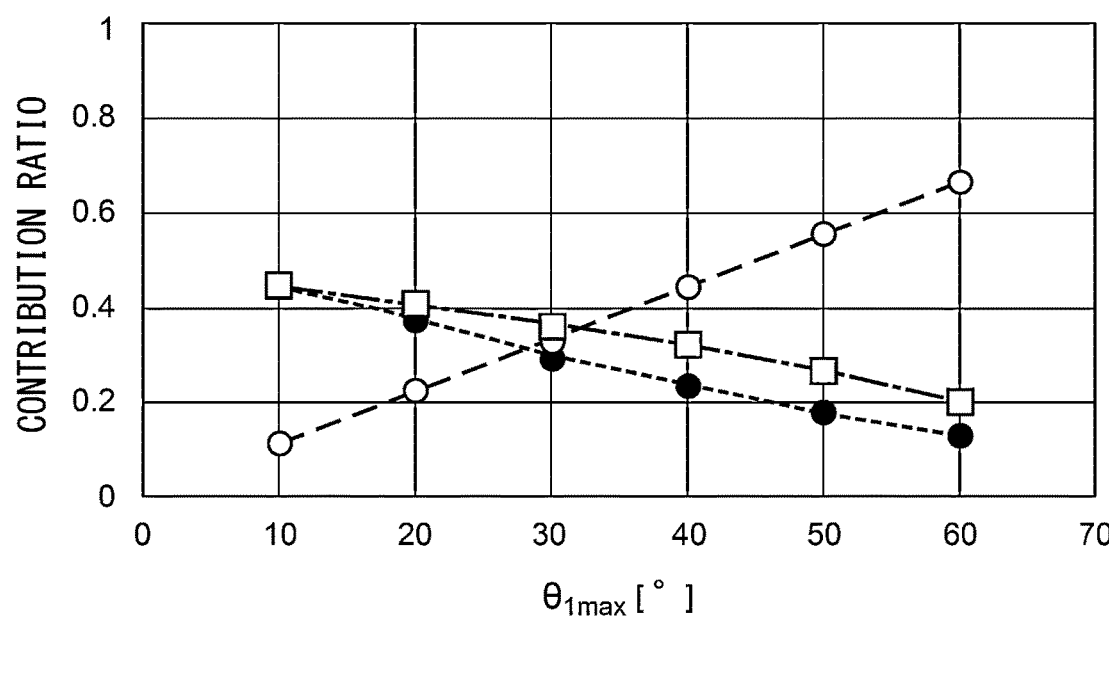
FIG. 33 is a diagram illustrating a change in contribution ratio when $\theta_{1\ max}$ changes at $\theta_{3\ max}=90°$.
Figure 34:
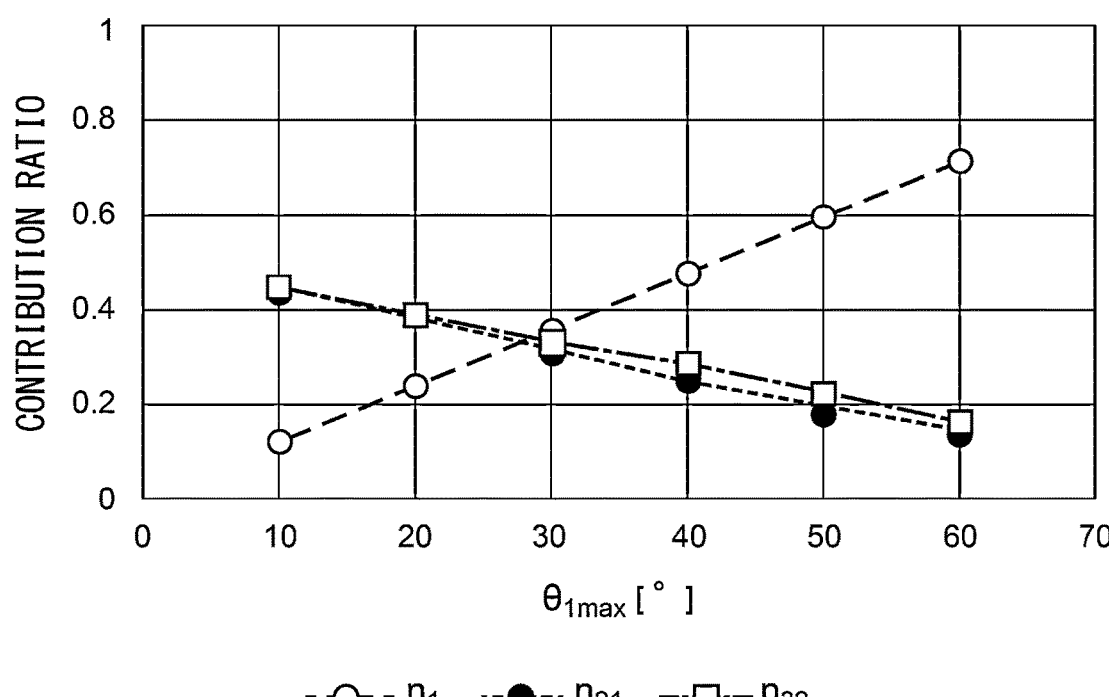
FIG. 34 is a diagram illustrating a change in contribution ratio when $\theta_{1\ max}$ changes at $\theta_{3\ max}=85°$.
Figure 35:
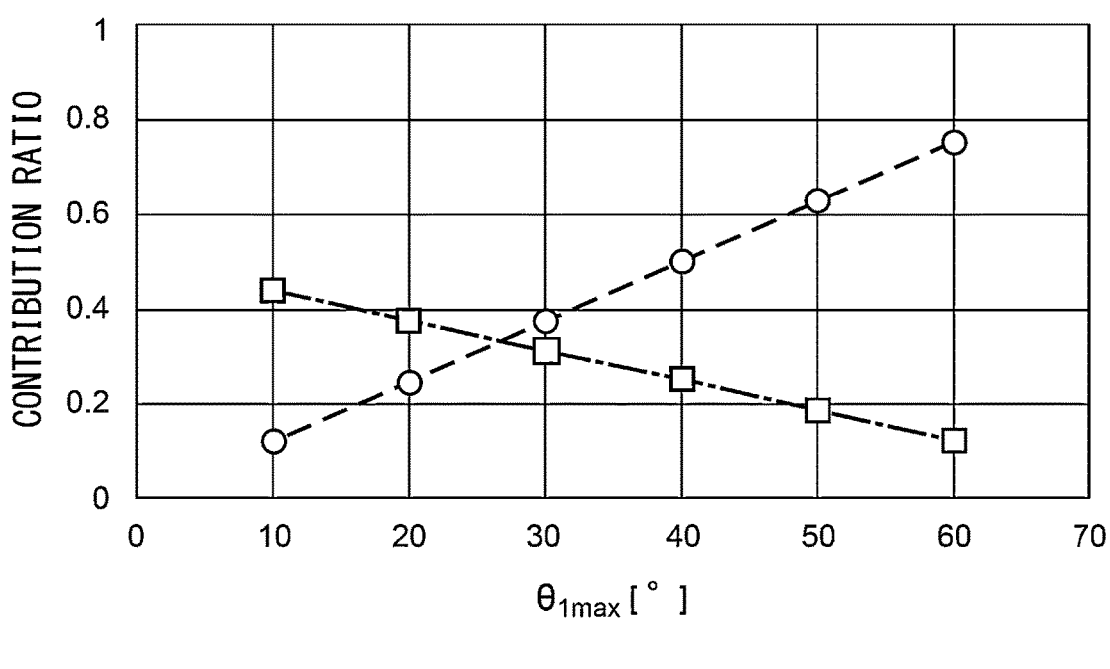
FIG. 35 is a diagram illustrating a change in contribution ratio when $\theta_{1\ max}$ changes at $\theta_{3\ max}=80°$.
Figure 36:
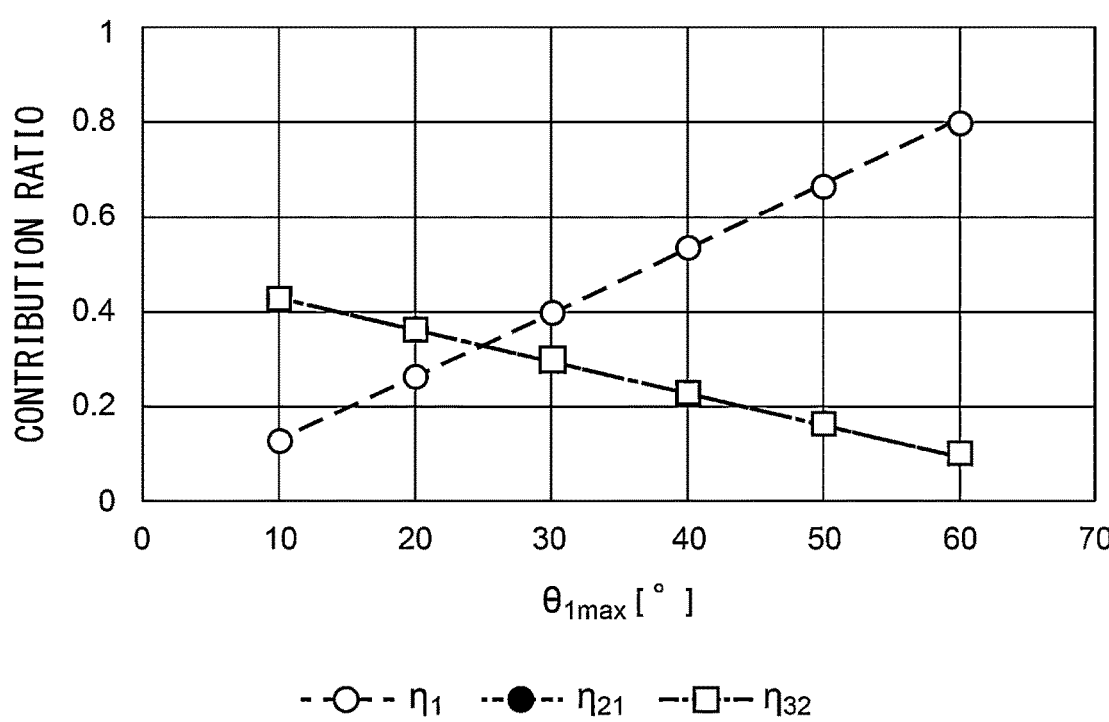
FIG. 36 is a diagram illustrating a change in contribution ratio when $\theta_{1\ max}$ changes at $\theta_{3\ max}=75°$.
Figure 37:
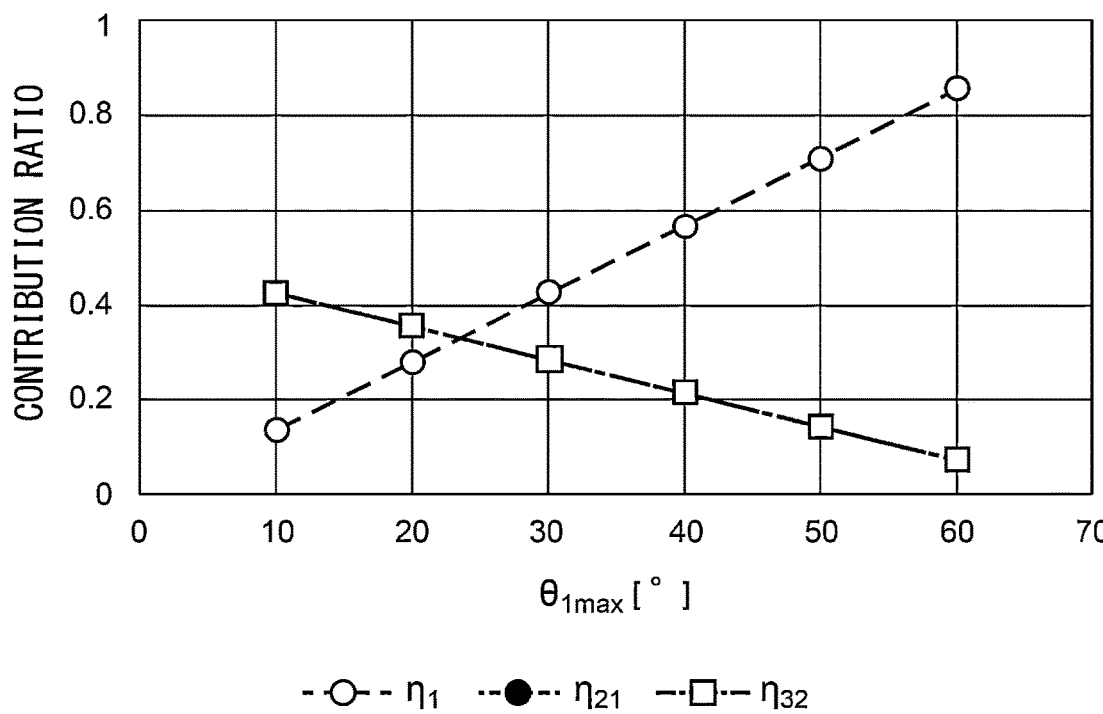
FIG. 37 is a diagram illustrating a change in contribution ratio when $\theta_{1\ max}$ changes at $\theta_{3\ max}=70°$.

FIGS. 33 to 37 illustrate results of calculating a combination of $\theta_{1\ max}$, $\theta_{2max}$, and $\theta_{3\ max}$ where the light radiation efficiency of the illumination device 10 is maximized. FIG. 33 illustrates a change in the contribution ratio when $\theta_{1\ max}$ changes at $\theta_{3\ max}=90°$. FIG. 34 illustrates a change in the contribution ratio when $\theta_{1\ max}$ changes at $\theta_{3\ max}=85°$. FIG. 35 illustrates a change in the contribution ratio when $\theta_{1\ max}$ changes at $\theta_{3\ max}=80°$. FIG. 36 illustrates a change in the contribution ratio when $\theta_{1\ max}$ changes at $\theta_{3\ max}=75°$. FIG. 37 illustrates a change in the contribution ratio when $\theta_{1\ max}$ changes at $\theta_{3\ max}=70°$. Note that, in FIGS. 34 and 35, the graphs of $\eta_{21}$ and $\eta_{32}$ partially overlap and cannot be visually distinguished.

As can be seen from FIG. 33, when $\theta_{1\ max}$ increases at $\theta_{3\ max}=90°$, $\eta_{21}$ and $\eta_{32}$ are not matched. This is because the inclination angle of the first surface of the meniscus lens 16 exceeds 90°, and the condition of $\eta_{21}=\eta_{32}$ cannot be satisfied. Further, as can be seen from FIG. 34, when $\theta_{1\ max}$ increases at $\theta_{3\ max}=85°$, $\eta_{21}$ and $\eta_{32}$ are not matched, but a difference is smaller than that at $\theta_{3\ max}=90°$ in FIG. 33. Further, as can be seen from FIGS. 35 to 37, at $\theta_{3\ max}=80°$, 75°, and 70°, $\eta_{21}=\eta_{32}$ is obtained in almost the entire range $\theta_{1\ max}$.

Figure 38:
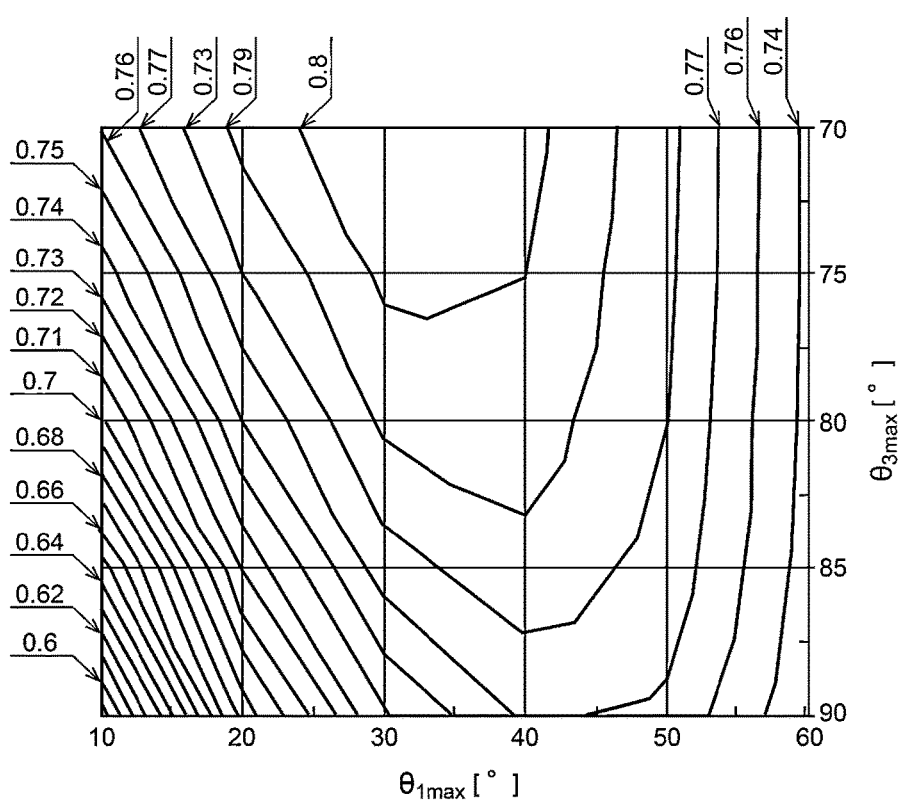
FIG. 38 is a diagram illustrating light radiation efficiency of the illumination device with contour lines under each condition in FIGS. 33 to 37.

FIG. 38 illustrates the light radiation efficiency of the illumination device 10 with contour lines under each condition of FIGS. 33 to 37. As can be seen from FIG. 38, as $\theta_{3\ max}$ increases, the light radiation efficiency decreases, and at the same time, $\theta_{1\ max}$ at which the light radiation efficiency is maximized increases. For example, when $\theta_{3\ max}$ is 90°, the light radiation efficiency is maximized (about 0.77) at $\theta_{1\ max}=40°$, and when $\theta_{3\ max}$ is 70°, the light radiation efficiency is maximized (about 0.81) at $\theta_{1\ max}$ around 30°.

The following can be known from FIG. 38.

(1') In the ranges of $\theta_{1\ max}=30°$ to 58° and $\theta_{3\ max}=70°$ to 90°, the light radiation efficiency is 0.75 or more.

(2') In the ranges of $\theta_{1\ max}=34°$ to 52° and $\theta_{3\ max}=70°$ to 90°, the light radiation efficiency is 0.76 or more.

(3') In the ranges of $\theta_{1\ max}=40°$ to 43° and $\theta_{3\ max}=70°$ to 90°, the light radiation efficiency is 0.77 or more.

(4') In the ranges of $\theta_{1\ max}=30°$ to 42° and $\theta_{3\ max}=70°$ to 80°, the light radiation efficiency is 0.79 or more.

(5') In the ranges of $\theta_{1\ max}=30°$ to 38° and $\theta_{3\ max}=70°$ to 75°, the light radiation efficiency is 0.80 or more.

On the other hand, as described above, when the light is spread to 140° or more ($70°\leq\theta_{3\ max}$), there is $\theta_2$ at which the light radiation efficiency is maximized, and the optimum $\theta_2$ may be determined by the above Formula (30) or (31).

Figure 39:
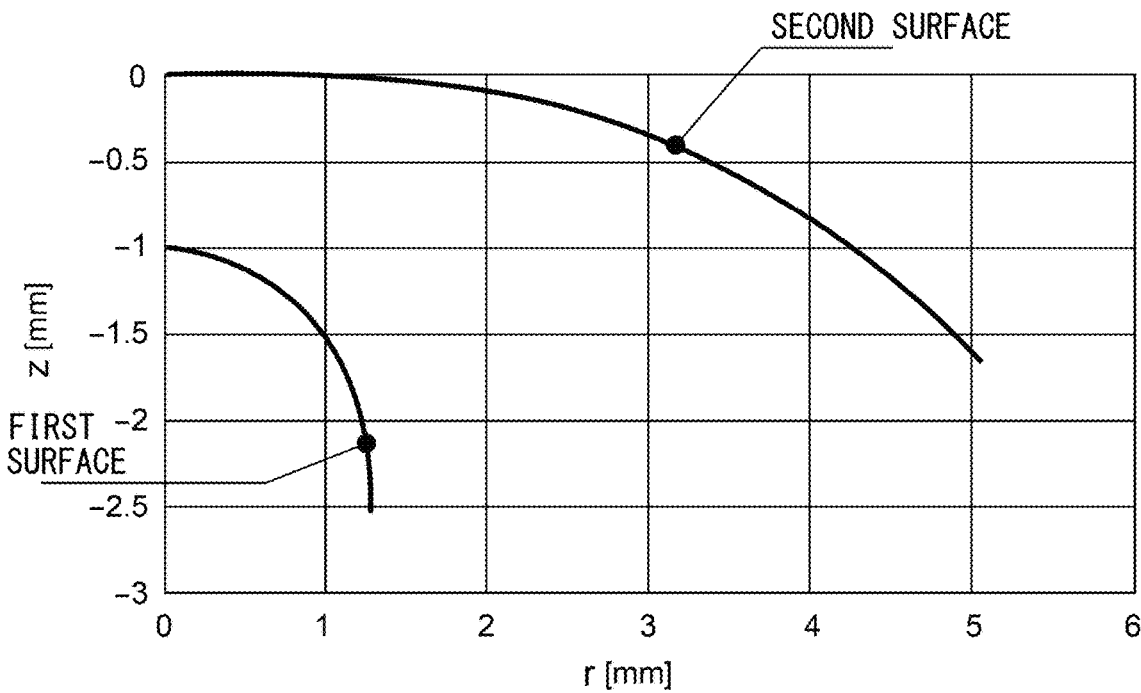
FIG. 39 is a diagram illustrating a meniscus lens for realizing the light distribution of FIG. 30 on the r-Z coordinates.
Figure 40:
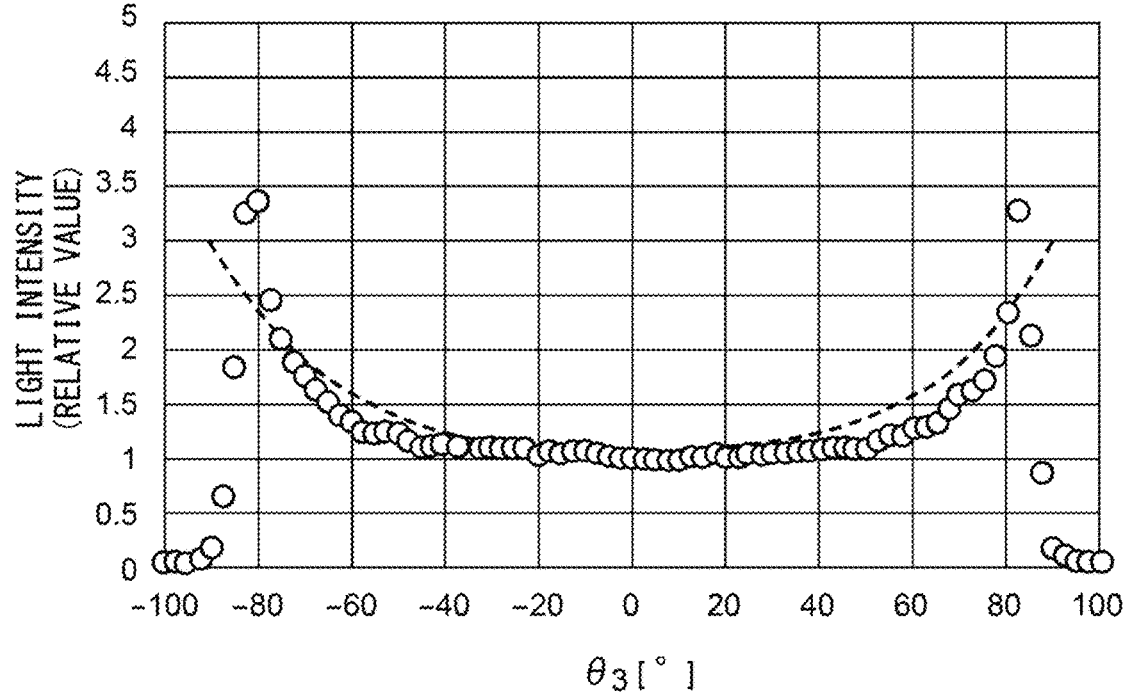
FIG. 40 is a diagram illustrating a light intensity distribution of the illumination device obtained by a simulation and an actually measured light intensity distribution of the illumination device.

The following Table 2 shows data of (r, Z) of the first surface 16a and the second surface 16b of the meniscus lens 16 for realizing the light distribution of FIG. 30. The meanings of r and Z are based on Formula (24). FIG. 39 illustrates the meniscus lens 16 on the r-Z coordinates. An apex of the second surface 16b was set as (r, Z)=(0, 0). The shape of the meniscus lens described in Table 2 is designed by the above-described method under the conditions of $\theta_{3\ max}=90°$ and $\theta_{1\ max}=40°$ with the light distribution in FIG. 30 as a target value. The meniscus lens was actually manufactured and the light distribution was measured, for a case where the same light source and diffusion plate are used with the same arrangement as that in the case where the light intensity is constant, and only the meniscus lens is changed to that in Table 2. FIG. 40 illustrates the measured light distribution. Note that a broken line in the drawing indicates a target light distribution. Although the actually measured value is slightly different from the simulation, $\theta_{3\ max}$ is 85° (an angle corresponding to the light intensity of 0.5 (an angle corresponding to a half value)), and the illumination device provides a uniform light distribution over a wider angle as compared with the technology described in the above Patent Document 1, for example.

TABLE 2

| First surface | | Second surface | |
|---|---|---|---|
| r [ m m ] | Z [ m m ] | r [ m m ] | Z [ m m ] |
| 0 | −1 | 0 | 0 |
| 0.034901 | −1.0005258 | 0.0570599 | 5.174E−05 |
| 0.0697681 | −1.0021027 | 0.1141847 | 0.0002056 |
| 0.1045677 | −1.0047289 | 0.1714378 | 0.0004571 |
| 0.1392662 | −1.0084007 | 0.2288757 | 0.000798 |
| 0.1738301 | −1.013113 | 0.2865562 | 0.0012155 |
| 0.2424223 | −1.0256287 | 0.4028687 | 0.002209 |
| 0.3100852 | −1.0421992 | 0.520808 | 0.0032547 |
| 0.3765689 | −1.0627211 | 0.6407738 | 0.0041092 |
| 0.4416355 | −1.0870663 | 0.7631249 | 0.0044749 |
| 0.5050617 | −1.1150839 | 0.8881714 | 0.0040072 |
| 0.5666406 | −1.1466022 | 1.016169 | 0.002323 |
| 0.6261835 | −1.1814312 | 1.1473152 | −0.0009908 |
| 0.6835215 | −1.2193657 | 1.2817472 | −0.0063676 |
| 0.7385064 | −1.2601879 | 1.4195414 | −0.0142524 |
| 0.7910116 | −1.3036702 | 1.5607147 | −0.0250931 |
| 0.8409317 | −1.3495787 | 1.7052268 | −0.0393331 |
| 0.8881832 | −1.3976752 | 1.852984 | −0.0574039 |
| 0.9327035 | −1.4477207 | 2.0038435 | −0.0797198 |
| 0.9744505 | −1.4994778 | 2.1576181 | −0.1066731 |
| 1.0134015 | −1.5527127 | 2.3140816 | −0.1386304 |
| 1.0495517 | −1.6071978 | 2.4729736 | −0.1759303 |
| 1.0829135 | −1.6627132 | 2.6340048 | −0.2188815 |
| 1.1135143 | −1.7190483 | 2.7968613 | −0.2677625 |
| 1.1413953 | −1.7760034 | 2.9612088 | −0.3228207 |
| 1.1666098 | −1.8333902 | 3.1266964 | −0.3842735 |
| 1.1892216 | −1.891033 | 3.2929598 | −0.4523086 |

TABLE 2-continued

| First surface | | Second surface | |
|---|---|---|---|
| r [ m m ] | Z [ m m ] | r [ m m ] | Z [ m m ] |
| 1.2093032 | −1.9487688 | 3.4596235 | −0.527085 |
| 1.2269347 | −2.0064479 | 3.626303 | −0.6087341 |
| 1.2422017 | −2.0639339 | 3.7926066 | −0.697361 |
| 1.2551947 | −2.1211032 | 3.9581363 | −0.7930451 |
| 1.266007 | −2.1778455 | 4.1224887 | −0.8958414 |
| 1.2747341 | −2.2340625 | 4.2852554 | −1.005781 |
| 1.2814725 | −2.2896682 | 4.4460232 | −1.1228717 |
| 1.2863188 | −2.3445879 | 4.6043744 | −1.2470981 |
| 1.2893686 | −2.3987575 | 4.7598863 | −1.3784219 |
| 1.2902495 | −2.4255439 | 4.8364442 | −1.4467271 |
| 1.2907164 | −2.4521234 | 4.9121317 | −1.5167817 |
| 1.2910071 | −2.4783993 | 4.9643218 | −1.5672695 |
| 1.2913548 | −2.5042953 | 5.0145005 | −1.6184576 |
| 1.2917668 | −2.5298353 | 5.0625596 | −1.6703204 |

The present invention has been described on the basis of the embodiments. The embodiments are merely examples, and it is understood by those skilled in the art that various modifications can be made in the combination of the respective components or the respective processing processes, and that the modifications are also within the scope of the present invention.

INDUSTRIAL APPLICABILITY

The present invention can be used in an illumination device using a laser as a light source.

What is claimed is:

1. An illumination device comprising:

a light source emitting parallel light or divergent light;

a diffusion element receiving the light emitted from the light source and emitting the light at a diffusion angle of 50° or more and 110° or less; and a lens group having negative power, having a first surface that receives the light emitted from the diffusion element and a second surface that emits the light at a light distribution angle of 140° or more, wherein an emission angle $\theta_1$ of the light from the diffusion element, an emission angle $\theta_2$ of the light from the first surface of the lens group, and an emission angle $\theta_3$ of the light from the second surface of the lens group satisfy a relational requirement $\theta_2-\theta_1\leq\theta_3-\theta_2$, wherein the illumination device exhibits a light-intensity distribution having a coefficient of variation (CV value) of 0.05 or less within a range of $-70°\leq\theta_3\leq70°$, the CV value being defined as a ratio of a standard deviation of the light intensity to an average light intensity in the same range.

2. The illumination device according to claim 1, wherein the lens group includes a meniscus lens and has negative power.

3. The illumination device according to claim 1, wherein the diffusion element is a microlens array.

4. The illumination device according to claim 1, wherein the lens group is a single meniscus lens having negative power.

5. The illumination device according to claim 1, wherein the illumination device has a light radiation efficiency of 0.75 or more in ranges of $\theta_{1\ max}=27°$ to 58° and $\theta_{3\ max}=70°$ to 90°, where a maximum value of $\theta_1$ is $\theta_{1\ max}$ and a maximum value of $\theta_3$ is $\theta_{3\ max}$.

6. A lens provided in the illumination device according to claim 1.

7. A set of a diffusion element and a lens provided in the illumination device according to claim 1.

8. A sensor device comprising the illumination device according to claim 1.

9. A traveling body comprising the sensor device according to claim 8.

\* \* \* \* \*